(12) United States Patent
Lee et al.

(10) Patent No.: US 11,284,370 B2
(45) Date of Patent: Mar. 22, 2022

(54) METHOD BY WHICH TERMINAL TRANSMITS RANGING RESPONSE SIGNAL IN WIRELESS COMMUNICATION SYSTEM, AND TERMINAL USING METHOD

(71) Applicant: LG Electronics Inc., Seoul (KR)

(72) Inventors: Seungmin Lee, Seoul (KR); Hyukjin Chae, Seoul (KR); Hanbyul Seo, Seoul (KR); Sangrim Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/762,387

(22) PCT Filed: Nov. 8, 2018

(86) PCT No.: PCT/KR2018/013534
§ 371 (c)(1),
(2) Date: May 7, 2020

(87) PCT Pub. No.: WO2019/093783
PCT Pub. Date: May 16, 2019

(65) Prior Publication Data
US 2020/0359354 A1 Nov. 12, 2020

Related U.S. Application Data

(60) Provisional application No. 62/583,418, filed on Nov. 8, 2017.

(51) Int. Cl.
*H04W 4/00* (2018.01)
*H04W 64/00* (2009.01)
*G01S 5/14* (2006.01)
*H04W 52/36* (2009.01)
*H04W 72/04* (2009.01)
*H04W 92/18* (2009.01)

(52) U.S. Cl.
CPC .............. *H04W 64/006* (2013.01); *G01S 5/14* (2013.01); *H04W 52/36* (2013.01); *H04W 72/0473* (2013.01); *H04W 92/18* (2013.01)

(58) Field of Classification Search
CPC .............. H04W 64/006; H04W 52/36; H04W 72/0473; H04W 92/18; G01S 5/14; G01S 5/16
USPC ........................................................ 370/329
See application file for complete search history.

(56) References Cited

U.S. PATENT DOCUMENTS

| | | | |
|---|---|---|---|
| 2011/0292819 A1* | 12/2011 | Ekbal | ................. G01S 13/765 370/252 |
| 2013/0039341 A1* | 2/2013 | Kim | ................. H04W 36/0055 370/331 |
| 2016/0044486 A1 | 2/2016 | Pais et al. | |
| 2016/0295565 A1 | 10/2016 | Kim et al. | |
| 2017/0027011 A1 | 1/2017 | Chae et al. | |
| 2017/0244501 A1 | 8/2017 | Yasukawa et al. | |

* cited by examiner

*Primary Examiner* — Huy C Ho
(74) *Attorney, Agent, or Firm* — Dentons US LLP

(57) ABSTRACT

Provided are a method by which a terminal transmits a ranging response signal in a wireless communication system, and a terminal using the method. The method comprises: receiving a ranging request signal from another terminal; and transmitting a ranging response signal to the other terminal in response to the ranging request signal, wherein a resource for transmission of the ranging response signal is determined on the basis of a reception power level of the ranging request signal.

13 Claims, 31 Drawing Sheets

FIG. 7
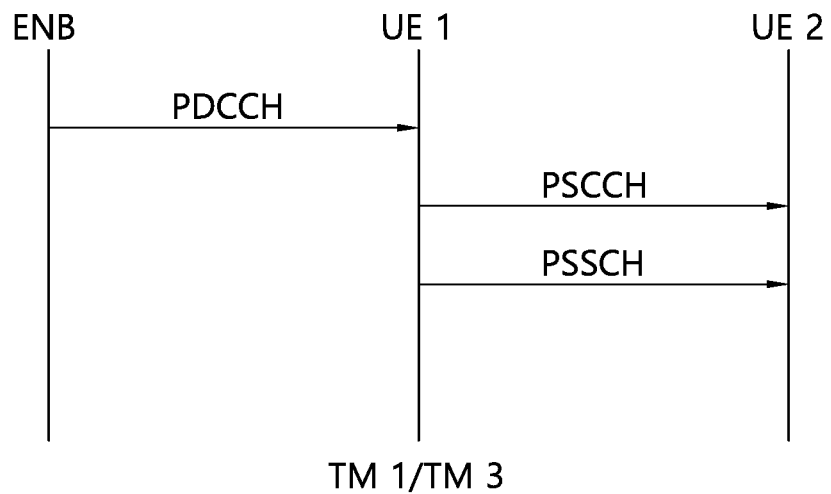
(a)
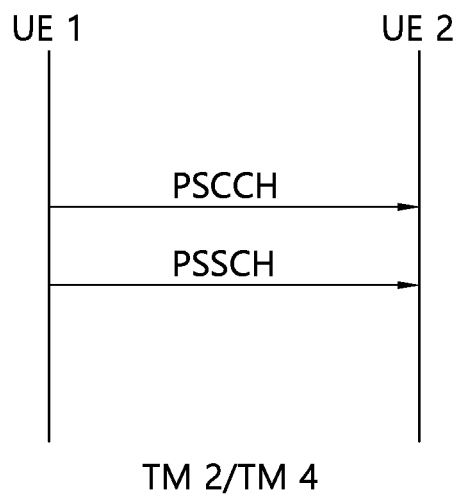
(b)

METHOD BY WHICH TERMINAL TRANSMITS RANGING RESPONSE SIGNAL IN WIRELESS COMMUNICATION SYSTEM, AND TERMINAL USING METHOD

This application is the National Stage filing under 35 U.S.C. 371 of International Application No. PCT/KR2018/013534, filed on Nov. 8, 2018, which claims the benefit of U.S. Provisional Application No. 62/583,418 filed on Nov. 8, 2017, the contents of which are all hereby incorporated by reference herein in their entirety.

BACKGROUND OF THE DISCLOSURE

Field of the Disclosure

The present disclosure relates to wireless communication, and more particularly, to a method in which a terminal transmits a ranging response signal for distance measurement in a wireless communication system and a terminal using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced arms to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, the interest in device-to-device (D2D) technology for direct communication between devices is increasing. In particular, the D2D is drawing attention as a communication technology for a public safety network. Commercial communication networks are rapidly changing to LTE, but current public safety networks are mainly based on 2G technology in terms of conflict and cost with the existing communication standards. The technical gap and the need for improved services are leading to efforts to improve the public safety networks.

In direct communication between terminals, a method of accurately measuring a distance between terminals is needed. An example of a distance measurement method is a two-way distance measurement method. In the two-way distance measuring method, a transmitter transmits a specific signal, and a receiver, having successfully received the specific signal feeds back the specific signal. The transmitter may estimate a distance using a phase difference between the transmitted specific signal and the received specific signal.

When direct communication between terminals is used between the terminals installed in a vehicle, i.e., when direct communication between terminals is used for vehicle-to-vehicle (V2V) communication or vehicle-to-everything (V2X) communication, it is necessary that the distance measurement method is performed with high reliability and short delay.

SUMMARY OF THE DISCLOSURE

The present disclosure provides a method of transmitting a ranging response signal used for measuring a distance of a terminal in a wireless communication system and a terminal using the method.

In an aspect, a method of transmitting a ranging response signal performed by a terminal in a wireless communication system is provided. The method may comprise receiving a ranging request signal from another terminal and transmitting a ranging response signal to the another terminal in response to the ranging request signal, wherein a resource for transmitting the ranging response signal is determined based on a received power level of the ranging request signal.

A start position of the resource for transmitting the ranging response signal may be determined according to the received power level.

The method may further comprise receiving information notifying a resource to be used for transmitting the ranging response signal from a network according to the received power level.

The resource for transmitting the ranging response signal may be determined according to the received power level of the ranging request signal and a distance to the another terminal.

When the received ranging request signal is referred to as a second ranging request signal, the second ranging request signal may further comprise a ramping value of transmission power.

The ramping value of the transmission power may be information notifying an increase value of second transmission power used for transmitting the second ranging request signal based on first transmission power applied to the first ranging request signal transmitted earlier than the second ranging request signal by the another terminal.

A resource for transmitting the ranging response signal may be determined according to a value obtained by subtracting the ramping value from a received power level of the second ranging request signal.

A first ranging response signal for the ranging request signal and a second ranging response signal for the another ranging request signal may be frequency division multiplexed (FDM) and transmitted at the same time point, when a ranging request signal other than the ranging request signal is also received.

One transmission resource pool may be selected from a plurality of transmission resource pools according to the received power level, and a resource for transmitting the ranging response signal may be determined in the selected transmission resource pool.

The plurality of transmission resource pools each may be time division multiplexed (TDM).

One transmission resource pool may be selected from a plurality of transmission resource pools according to the received power level of the ranging request signal and a distance to the another terminal, and a resource for transmitting the ranging response signal is determined in the selected transmission resource pool.

The plurality of transmission resource pools each may be time division multiplexed (TDM).

In another aspect, a user equipment (UE) is provided. The UE may comprise a transceiver configured to transmit and receive wireless signals and a processor configured to control the transceiver, wherein the processor is configured to receive a ranging request signal from another UE and to transmit a ranging response signal to the another UE in response to the ranging request signal, a resource for transmitting the ranging response signal is determined based on a received power level of the ranging request signal.

According to the present disclosure, a resource used when transmitting a ranging response signal, which is a response to a ranging request signal received from another terminal may be determined based on received power of the ranging request signal. In a situation in which distance/channel state/transmission powers between terminals are various, when a plurality of ranging request signals are received, there is a high probability that each of received power levels of the ranging request signals is different. As a result, the probability increases that resources to be used for transmission of each of the ranging response signals will be different. That is, the probability of collision or interference in transmission of the ranging response signal reduces, and as a result, distance measurement between terminals can be performed more accurately and quickly.

BRIEF DESCRIPTION OF THE DRAWINGS

FIG. 7 illustrates a UE operation according to a transmission mode (TM) related to V2X/D2D.

DESCRIPTION OF EXEMPLARY EMBODIMENTS

Hereinafter, terms or abbreviations that are not separately defined may be defined in 3GPP TS 36 series or TS 38 series.

Figure 1:
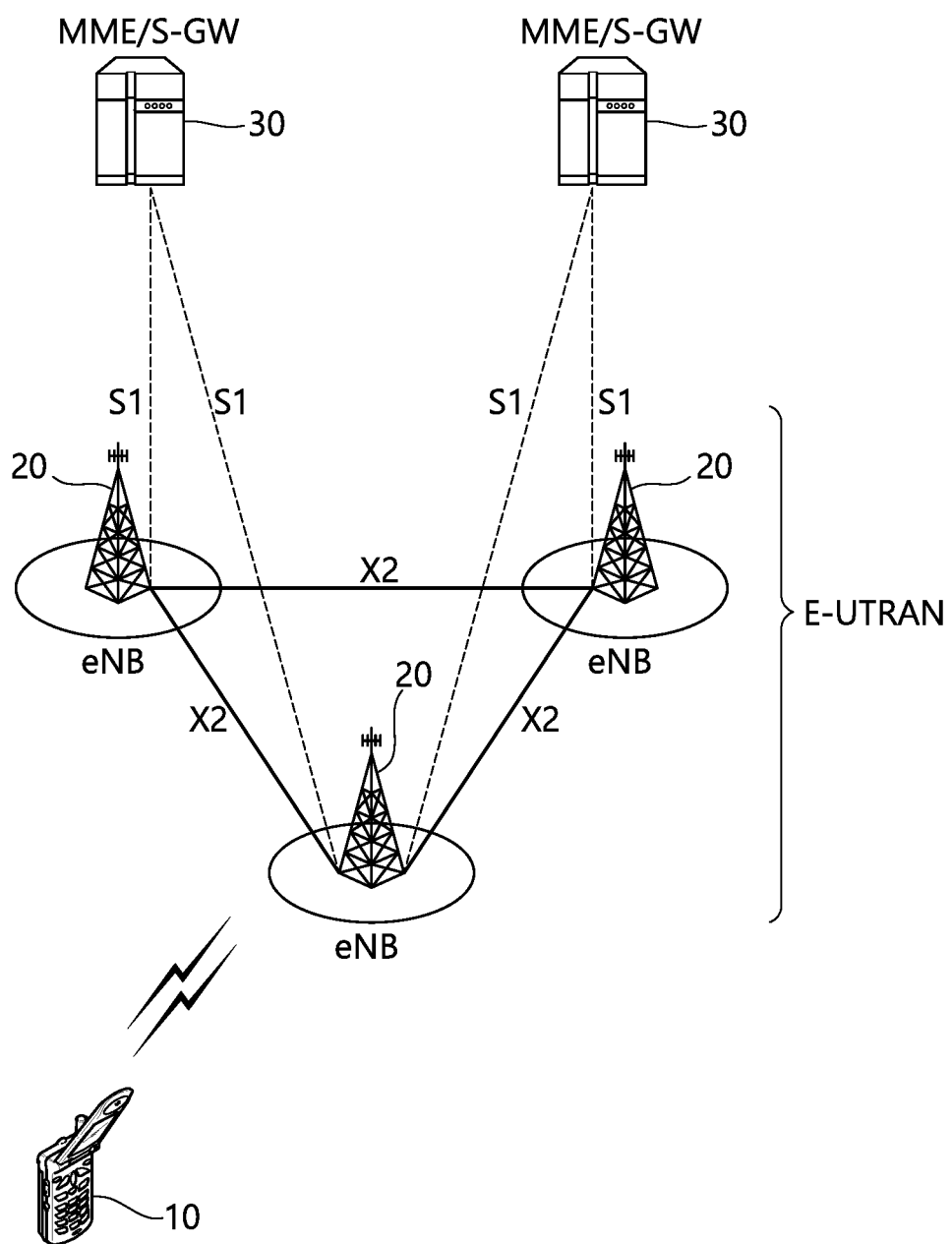
FIG. 1 illustrates a wireless communication system.

FIG. 1 illustrates a wireless communication system. This may also be called an evolved-UMTS terrestrial radio access network (E-UTRAN), or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
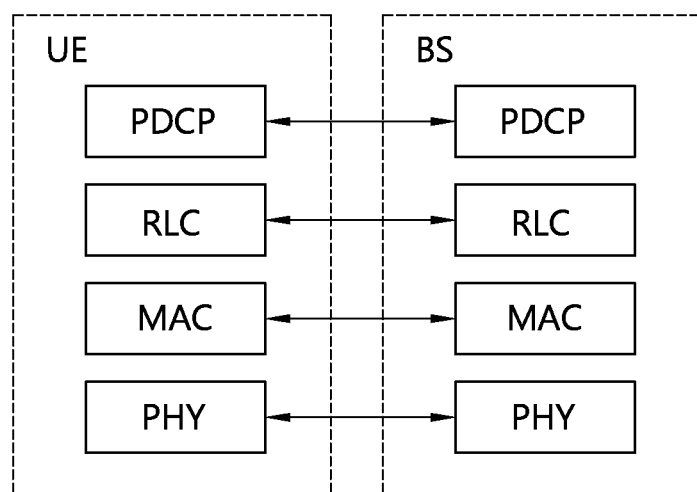
FIG. 2 is a diagram showing a wireless protocol architecture for a user plane.
Figure 3:
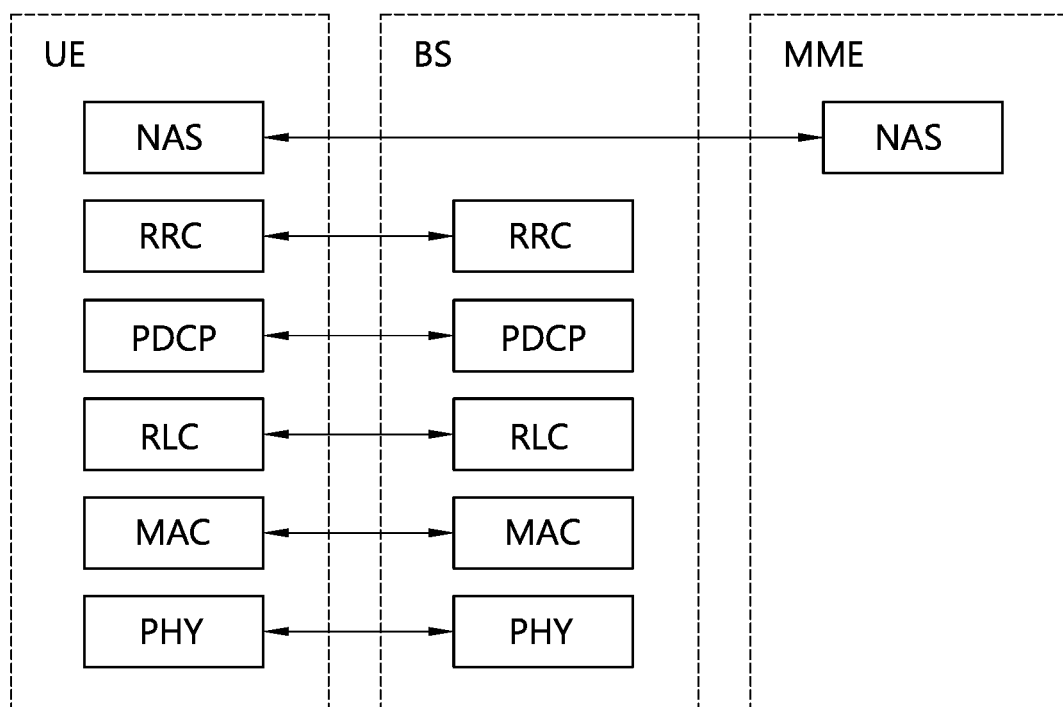
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described. The new radio access technology may be abbreviated as new radio (NR).

As more communication devices require larger communication capacities, there is a need for improved mobile broadband communication compared to the existing radio access technology (RAT). In addition, massive machine type communications (MTC), which connects between multiple devices and objects to provide various services anytime and anywhere, is also one of the major issues to be considered in next-generation communication. In addition, communication system designs considering services/terminals that are sensitive to reliability and latency have been discussed. The introduction of the next-generation wireless access technologies in consideration of such enhanced mobile broadband communication, the massive MTC, ultra-reliable and low latency communication (URLLC), and the like, have been discussed, and in the present document, for convenience, the technology is referred to as new RAT or NR.

Figure 4:
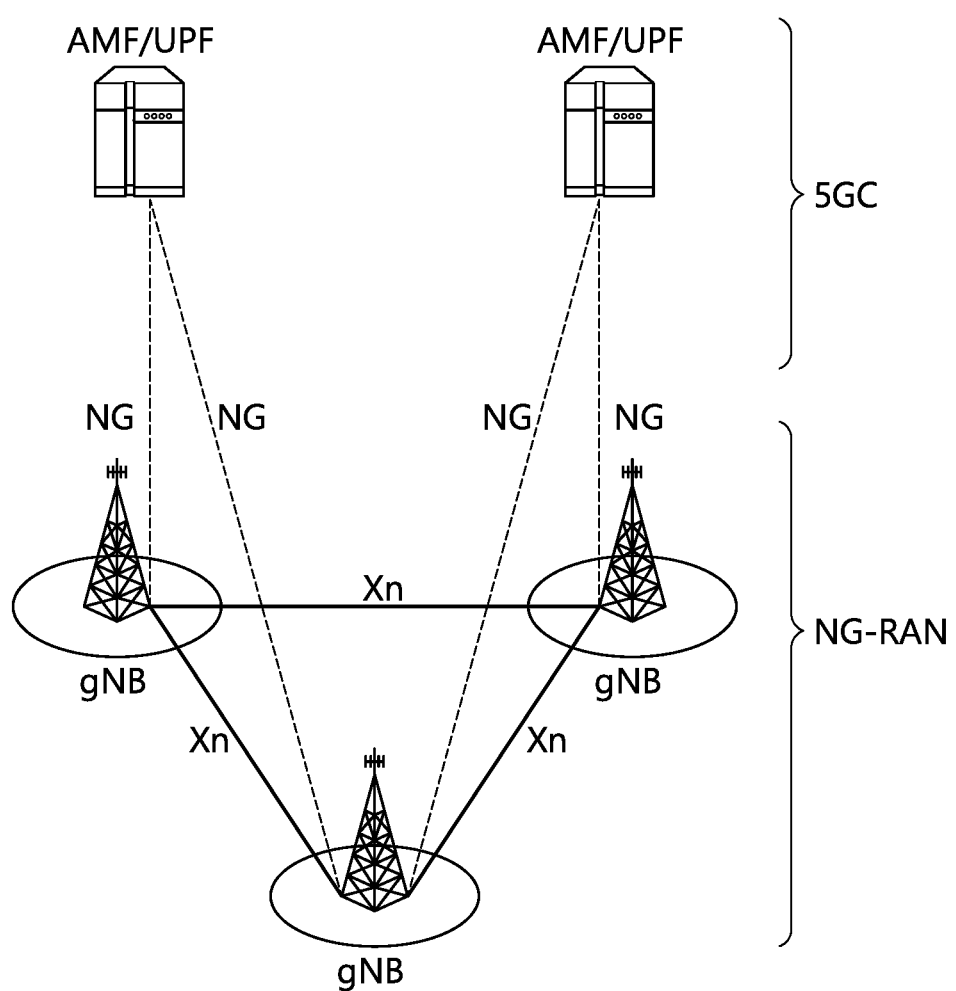
FIG. 4 illustrates a system structure of a new generation radio access network (NG-RAN) to which the NR is applied.

FIG. 4 illustrates a system structure of a new generation radio access network (NG-RAN) to which the NR is applied.

Referring to FIG. 4, the NG-RAN may include gNB and/or eNB that provides user plane and control plane protocol termination to a terminal. FIG. 4 illustrates a case of including only the gNB. The gNB and the eNB are connected to each other via an Xn interface. The gNB and the eNB are connected to a 5G core network (5GC) via an NG interface. More specifically, the gNB and the eNB are connected to an access and mobility management function (AMF) via an the NG-C interface, and are connected to a user plane function (UPF) via an NG-U interface.

Figure 5:
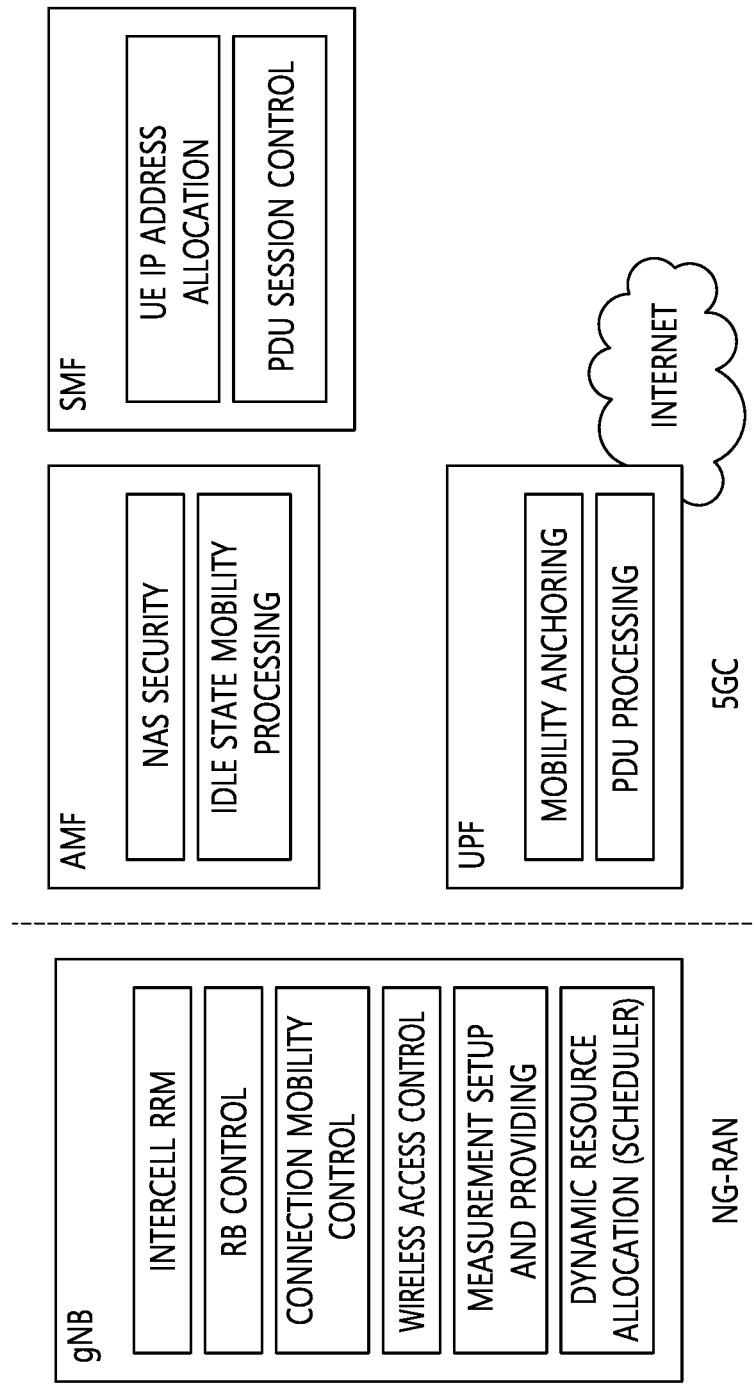
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (inter cell RRM), radio bearer management (RB control), connection mobility control, radio admission control, and measurement configuration and provision, and dynamic resource allocation. The AMF may provide functions such as NAS security and idle state mobility processing. The UPF may provide functions such as mobility anchoring and PDU processing. The session management function (SMF) may provide functions such as terminal IP address allocation and PDU session control.

Figure 6:
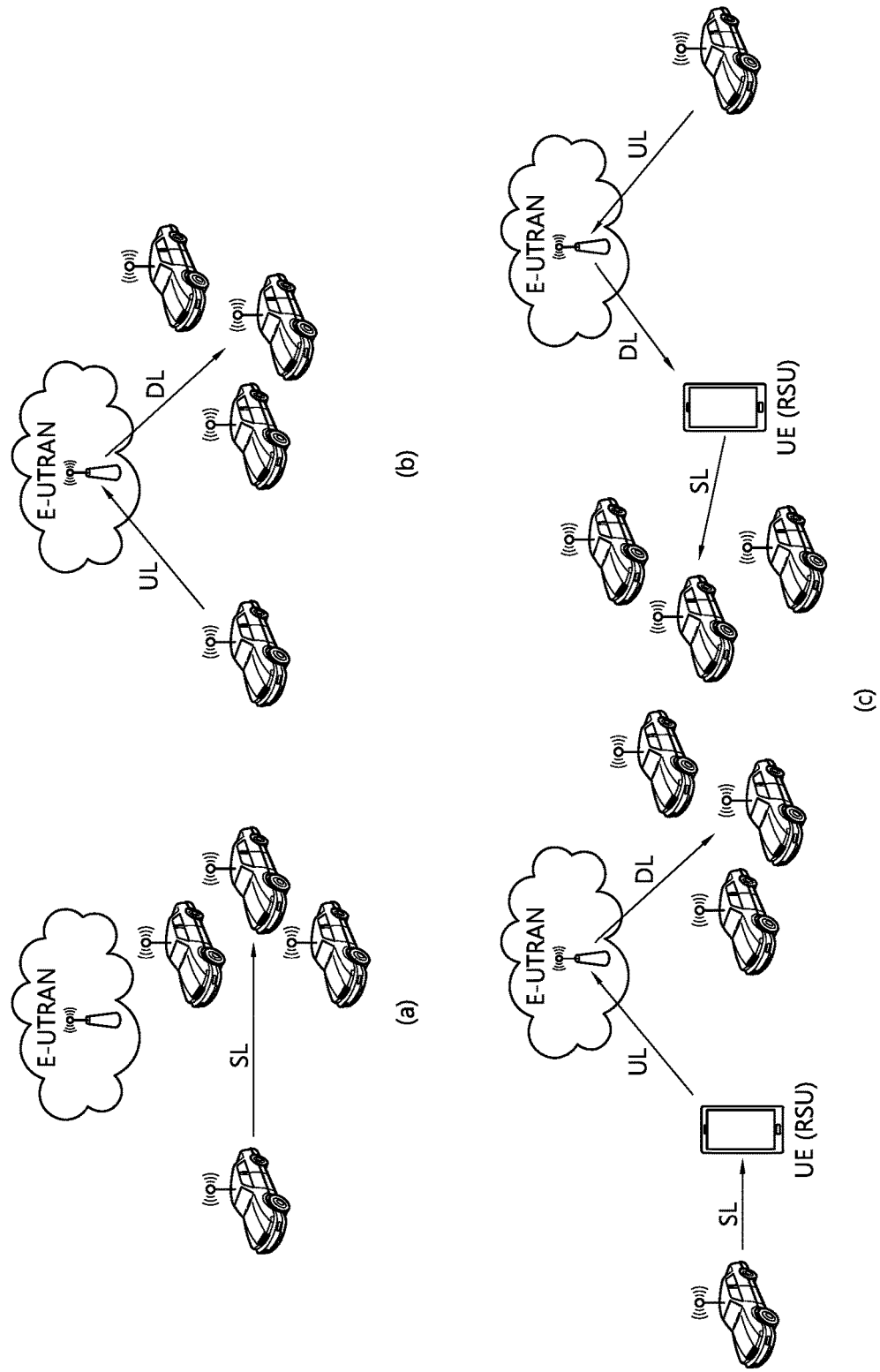
FIG. 6 illustrates scenarios for V2X communication.

FIG. 6 illustrates scenarios for V2X communication.

Referring to FIG. 6(a), V2X communication may support a PC5 based information exchange operation (between UEs), which is an interface between UEs, and as illustrated in FIG. 6(b), V2X communication may support a Uu based information exchange operation (between UEs), which is an interface between an eNodeB and a UE. Further, as illustrated in FIG. 6(c), V2X communication may support an information exchange operation (between UEs) using both PC5 and Uu.

FIG. 7 illustrates a UE operation according to a transmission mode (TM) related to V2X/D2D.

FIG. 7(a) is for transmission modes 1 and 3, and FIG. 7(b) is for transmission modes 2 and 4. In the transmission mode 1/3, the eNB performs resource scheduling through a PDCCH (more specifically, DCI) to a UE 1, and the UE 1 performs D2D/V2X communication with a UE 2 according to the resource scheduling. After transmitting sidelink control information (SCI) to the UE 2 through a physical sidelink control channel (PSCCH), the UE 1 may transmit data through a physical sidelink shared channel (PSSCH) based on the SCI. The transmission mode 1 may be applied to D2D, and the transmission mode 3 may be applied to V2X.

The transmission mode 2/4 may be a mode in which the UE schedules itself. More specifically, the transmission mode 2 is applied to D2D, and the UE may select a resource itself in a preset resource pool to perform a D2D operation. The transmission mode 4 is applied to V2X, and the UE may select a resource in a selection window via a sensing/SA decoding process and then perform a V2X operation. After transmitting the SCI to the UE 2 through a PSCCH, the UE 1 may transmit data based on the SCI through the PSSCH. Hereinafter, the transmission mode may be abbreviated as a mode.

Control information transmitted by the eNB to the UE through the PDCCH may be referred to as downlink control information (DCI), whereas control information transmitted by the UE to another UE through the PSCCH may be referred to as SCI. The SCI may deliver sidelink scheduling information. SCI may have various formats, for example, SCI format 0 and SCI format 1.

The SCI format 0 may be used for scheduling of the PSSCH. The SCI format 0 may include a frequency hopping flag (1 bit), a resource block allocation and hopping resource allocation field (the number of bits may vary according to the number of resource blocks of the sidelink), a time resource pattern (7 bits), a modulation and coding scheme (MCS, 5 bits), time advance indication (11 bits), group destination ID (8 bits), and the like.

The SCI format 1 may be used for scheduling of the PSSCH. The SCI format 1 includes a priority (3 bits), resource reservation (4 bits), a frequency resource location of initial transmission and retransmission (the number of bits may vary according to the number of sub-channels of the sidelink), a time gap between initial transmission and retransmission (4 bits), MCS (5 bits), retransmission index (1 bit), and reserved information bits. The reserved information bits may be abbreviated as reserved bits. The reserved bits may be added until a bit size of the SCI format 1 becomes 32 bits. That is, the SCI format 1 includes a plurality of fields including different information, and in the fixed total number of bits (32 bits) of the SCI format 1, bits of the remaining number except for the total number of bits of the plurality of fields may be referred to as reserved bits.

The SCI format 0 may be used for transmission modes 1 and 2, and the SCI format 1 may be used for transmission modes 3 and 4.

Hereinafter, the present disclosure will be described in detail.

<Distance Measurement Technique>

The method/apparatus in accordance with the following distance measurement techniques may be utilized in using distance, direction, and location between wireless communication systems. The following method/apparatus may be applied to the above-described V2X or may be utilized in general wireless communication. For example, it may be used to measure the distance between a particular entity (e.g., a vehicle) and another entity in a V2X system, or to measure the coordinates of a particular entity on a 3GPP network.

In the conventional 3GPP LTE system, the position was measured based on Observed Time Difference Of Arrival (OTDOA). OTDOA is a technology embodied through 3GPP Rel-9 and the like and uses at least three base stations including a serving base station. Specifically, in order to measure the location of a UE, two hyperbolic equations are generated based on Reference Signal Time Difference (RSTD) information of the base station downlink signal, and an operation for obtaining a solution of the equation is performed. However, for distance measurement based on OTDOA, time synchronization between entities transmitting signals for distance measurement should be ensured.

The distance measuring technique according to the present specification does not need to secure time synchronization of the transmitter and the receiver, as described below, and provides higher accuracy than the conventional technique. As a result, it can be applied to a V2X system requiring accurate distance measurement, and can be applied to various systems requiring precise distance measurement.

The distance measurement technique according to the present specification may include a method of measuring a distance between wireless communication devices. For example, the apparatuses (i.e., the transmitter and the receiver) that are subject to the distance measurement may measure the distance by using phase information of radio signals transmitted from each other. In the following example, a situation of transmitting and receiving a signal using two frequencies w1 and w2 has been described, but the number of frequencies used for transmission and reception may be variously determined. In addition, the examples described below assume a situation of transmitting a plurality of frequencies at the same time, but it is also possible to apply the principles of the present specification in consideration of the transmission at a different predetermined time point.

Hereinafter, a specific example of the distance measuring technique according to the present specification will be described based on equations, and then the specific technique according to the present specification will be described through generalized terms.

When observing a radio signal transmitted at a specific point with an angular frequency w at a time t at a point place away from the transmission point by x, the observed signal is expressed by the following equation.

$$E(w,t,x) = A(x) * \exp(j*(w*t - k*x + \phi)) \quad \text{[Equation 1]}$$

In the Equation, A means the amplitude (amplitude) of the radio signal at the location, k means a variable that satisfies the condition of $$k = \frac{w}{c},$$

and c means the speed of light.

Figure 8:
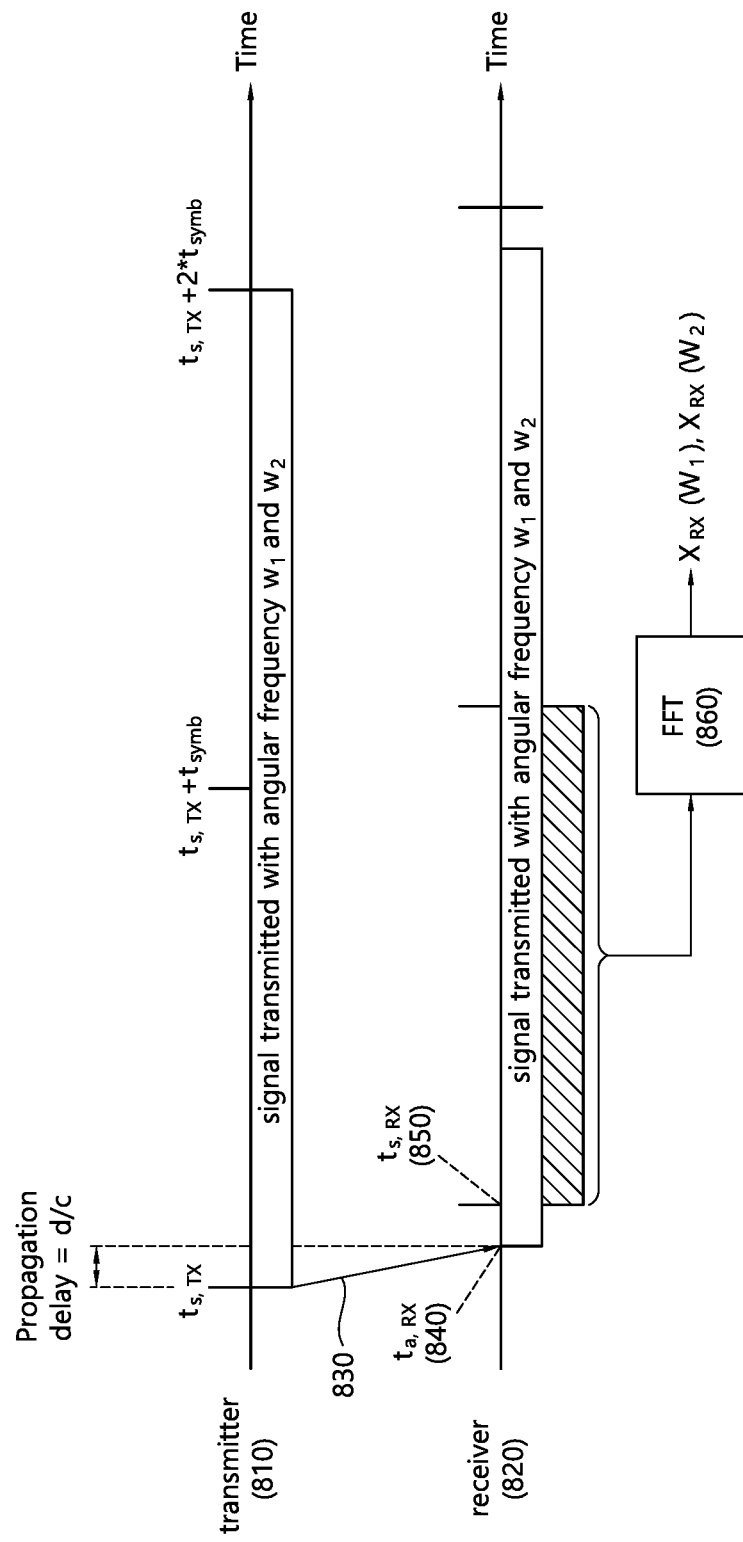
FIG. 8 is a diagram illustrating operations in a transmitter and a receiver.

FIG. 8 is a diagram illustrating operations in a transmitter and a receiver. The transmitter is a device for transmitting a transmission signal for distance measurement, and the receiver is a device which receives the corresponding transmission signal, processes the received transmission signal, and then transmits the reception signal generated by the receiver, to the transmitter. An example of FIG. 8 relates to a technique by which a transmitter measures a distance between the transmitter and a receiver via the reception signal.

In the example described below, it is assumed that a time point at which a transmitter and a receiver perform signal transmission and reception operations is quantized. For example, when transmitting and receiving a signal based on OFDM, the boundary point of each OFDM symbol is a quantized time point for performing transmission and reception operations. For convenience, it is assumed that the start time of the transmitting and receiving operations of the transmitter and the receiver starts from $t_{s,TX}$ and $t_{s,RX}$, respectively, and it is assumed that they appear repeatedly for each $t_{symb}$. In the case of OFDM, $t_{symb}$ may be the length of an OFDM symbol.

The transmitter is located at x=0 and transmits the distance measurement signal (i.e., transmission signal) through two frequencies w1 and w2 at $t=t_{s,TX}$. In this case, the initial phases of the two frequency components of the transmission signal may be set to be the same or may be set to be different from each other by a preset amount. Hereinafter, an example in which the initial phases are the same will be described for convenience of description. In this case, the transmission signal observed at the location of the transmitter is then shown below.

$$E(w_1,t,x=0)=A(0)*\exp(j*(w_1*(t-t_{s,TX})+\phi))$$

$$E(w_2,t,x=0)=A(0)*\exp(j*(w_2*(t-t_{s,TX})+\phi)) \quad \text{[Equation 2]}$$

It is assumed that the receiver is placed away from the transmitter by d. The signal transmitted by the transmitter at $t=t_{s,TX}$ arrives at the receiver at $t=t_{a,RX}=t_{s,TX}+d/c$. The signal observed by the receiver is shown below.

$$E(w_1,t,x=d)=A(d)*\exp(j*(w_1*t-w_1*t_{s,TX}-k_1*d+\phi))$$

$$E(w_2,t,x=d)=A(d)*\exp(j*(w_2*t-w_2*t_{s,TX}-k_2*d+B+\phi)) \quad \text{[Equation 3]}$$

As previously assumed, it is assumed that the point in time at which the receiver can actually start to process the transmission signal (for example, the OFDM processing point in the receiver) is quantized and the above signal is processed at $t=t_{s,RX}$. In the example of FIG. 8, it is assumed that OFDM processing using fast Fourier transform (FFT) is performed. The form of multiplying sinusoidal signals of various frequencies appearing as multiples of the fundamental frequency with initial phase=0 at $t=t_{s,RX}$, and adding the result values is shown. In this case, it is remained only when the sinusoidal signal of the same frequency as the frequency of the reception signal is multiplied due to the property of the FFT, and in the case that it is multiplied with other frequencies, it becomes 0 in the summing-up process.

According to the attributes of the FFT operation/process as described above, the value $X_{RX}(w_1)$ obtained by the receiver for the frequency w1 component as the FFT result is expressed by the following equation.

$$X_{RK}(w_1) = E(w_1, t, x = d) * \exp(-j*w_1(t-t_{s,RX})) = \quad \text{[Equation 4]}$$
$$A(d) * \exp(j*(w_1*t - w_1*t_{s,TX} -$$
$$k_1*d - w_1*t + w_1*t_{s,RX} + \phi)) =$$
$$A(d) * \exp(j*(w_1*t_{s,RX} - w*t_{s,TX} - k_1*d + \phi)) =$$
$$A(d) * \exp(j*(w_1(t_{s,RX} - t_{a,RX}) + \phi))$$

The above-described FFT operation/process is equally applied to the frequency w2 component, and the resulting value $X_{RX}(w_2)$ is expressed as follows.

$$X_{RX}(w_2)=A(d)*\exp(j*(w_2(t_{s,RX}-T_{a,RX})+\pi)) \quad \text{[Equation 5]}$$

The receiver may compare the two values ($X_{RX}(w_1)$, $X_{RX}(w_2)$) obtained through the above equation as follows.

$$\frac{X_{RX}(w_2)}{X_{RX}(w_1)} = \exp(j*(w_2 - w_1)(t_{s,RX} - t_{a,RX})) \quad \text{[Equation 6]}$$

Since the frequencies w1 and w2 of the transmission signal are known to the transmitter and the receiver, the receiver can calculate $t_{s,RX}-t_{a,RX}$ through Equation 6. Herein, $t_{s,RX}$ indicates a time point when the distance measurement signal is actually received by the receiver, and $t_{a,RX}$ indicates a time point of the OFDM processing by the receiver. As a result, the receiver may calculate a difference between the time point at which OFDM processing is started and the time point at which the actual signal reaches the receiver.

Through this, even if the receiver performs OFDM processing only at a specific quantized time point, the receiver may calculate the time when the signal transmitted by the specific transmitter actually arrives through appropriate phase calculation. In particular, this part is helpful when several devices transmit signals using different frequencies. Even if the receiver performs only a single FFT operation on the signal in which all signals overlap at a specific quantized point in time, the receiver may recognize a time point when an individual signal is received through subsequent simple phase calculations. In order for a receiver to recognize a time point of receiving an individual signal without using such an improve technique, very complex calculations and signal processing are required because it is necessary to determine whether a particular signal has arrived at each time point in the time dimension (for example, whether the value that correlates the expected signal with the actual signal is above a certain level).

The technical features described above will be described below with reference to FIG. 8.

The example of FIG. 8 may be used for distance measurement in a wireless communication system including a transmitter and a receiver that process signals in symbol units. In the example of FIG. 8, a symbol is a unit including conventional OFDM, OFDMA, and SC-FDMA symbols, and means a time unit for transmitting/receiving a radio signal. In FIG. 8, as described above, the transmitter 810 is a device for transmitting a transmission signal 830 for distance measurement, and a receiver 820 is a device that receives and processes a signal (that is, a transmission signal) transmitted by the transmitter 810.

As described above, the transmitter 810 may transmit the transmission signal 830 through a preset first frequency and a preset second frequency (e.g., w1, w2). That is, the transmission signal 830 may include a first transmission component for the first frequency w1 and may include a second transmission component for the second frequency w2. The transmission signal 830 including the second transmission component may be represented by Equation 2 and/or Equation 3 above.

The transmission signal 830 arrives at the receiver 820 at a "reception time point 840," which is represented by tax in the above-described example. Since the receiver 820 processes the transmission signal 830 (e.g., processes OFDM) in units of symbols, the actual processing for the corresponding signal starts at the processing point 850. The processing time point 850 is represented by $t=t_{s,RX}$ in the above-described example.

The receiver 820 may calculate $X_{RX}(w_1)$ as shown in Equation 4 through the FFT operation 860 for the first transmission component, and may calculate $X_{RX}(w_2)$ as shown in Equation 5 through the FFT operation 860 for the second transmission component. As a result, the receiver 820 may compare two different FFT calculation values (for example, by applying Equation 6), to thereby calculate the difference between the processing time point 850 and the reception time point 840 in the receiver 820.

Meanwhile, the first frequency w1 and the second frequency w2 may be determined in consideration of various situations. As described in Equation 6, since the difference between the first frequency w1 and the second frequency w2 may be calculated by multiplying the difference between the processing time point 850 and the receiving time point 840, when the difference between the first frequency w1 and the second frequency w2 is set to be large, the difference between the processing time point 850 and the reception time point 840 may be easily obtained in the receiver 820. That is, on the condition that the difference between the first frequency and second frequency is large, even when the difference between the processing time point 850 and the reception time point 840 is small, the final result value of Equation 6 becomes large, so that a small difference can be easily found. However, when the difference between frequencies increases, errors may occur in the calculation due to the frequency selective characteristic of the channel. Accordingly, the difference between the preset frequencies may be fixed but may be adaptively determined in consideration of channel characteristics. For example, at the transmitter 810, the receiver 820, and/or a third entity, a set of possible frequencies may be signaled in advance, and then indication information about the frequency to be actually used may be signaled or information about the channel characteristics may be signaled to thereby indicate the frequency to be actually used.

On the other hand, as shown in Equation 6, the operation value in the receiver 820 is calculated in the form of a phase. Accordingly, there may be a problem in that the case where the value of $(w_2-w_1)(t_{s,RX}-t_{a,RX})$ exceeds the range of 360 degrees is not distinguished from the case where it is not. However, since the difference between the processing time point 850 and the reception time point 840 in the actual channel environment may be shorter than the symbol length, the above-described problem will not be a big problem in the actual system implementation.

Through the above-described operation, the receiver 820 may obtain information about a difference between the processing time point 850 and the reception time point 840. Hereinafter, two detailed examples of measuring the distance to the transmitter 810 using the calculated information are proposed.

<Measuring Scheme 1>

It is possible for the receiver 820 to separately signal a difference (i.e., $t_{s,RX}-t_{a,RX}$) between the processing time point 850 and the reception time point 840. For example, the information (that is, the information about the difference in viewpoints) may be appropriately quantized, and then the quantized result may be formed into a series of bit strings, and the data having the generated bit strings as information may be transmitted to the transmitter 810. In addition, the receiver 820 transmits its distance measurement signal (processed as a reception signal on the part of the transmitter). In this case, the same frequency as the frequency used by the transmitter may be used as the distance measurement signal transmitted by the receiver, but different frequencies may be used.

As a specific example, in this case, the receiver 820 may transmit a signal in the same form as the transmitter 810 by using the first and second frequencies w1 and w2 at a time point $t=t_{s,RX}+n*t_{symb}$. This means that it transmits at the n-th quantized time point (e.g., the n-th OFDM symbol), and this n value may be a predetermined value. This signal (that is, a reception signal transmitted from the receiver to the transmitter) arrives at the transmitter at the time $t=t_{a,TX}=t_{s,RX}+n*t_{symb}+d/c$. Since $t_{s,TX}<t_{s,RX}$ is assumed above, the transmitter 810 performs OFDM processing on the reception signal at a time point $t=t_{s,TX}+(n+1)*t_{symb}$.

In this case, the transmitter 810 may perform an FFT operation on the first/second frequency to calculate a value corresponding to Equations 5 and 6 above. That is, the difference between the processing time $(t_{s,TX}+(n+1)*t_{symb})$ and the receiving time $t_{a,TX}$ in the transmitter 810 can be calculated. That is, the transmitter 810 may acquire the information $t_{s,TX}+(n+1)*t_{symb}-t_{a,TX}$. If the corresponding value is obtained, it is possible to obtain the distance d from the transmitter 810 according to Equation 7 below. This is because $t_{symb}$ is a value already known to both the transmitter and the receiver. Equation 7 is obtained by adding information $t_{s,TX}+(n+1)*t_{symb}-t_{a,TX}$ obtained by the transmitter to $t_{s,TX}-t_{a,TX}$ which is separately signaled by the receiver.

$$t_{s,RX}-t_{a,RX}+t_{s,TX}+(n+1)*t_{symb}-t_{a,TX}=t_{s,RX}-t_{s,TX}-d/c+t_{s,TX}+t_{symb}-t_{s,RX}-d/c=t_{symb}-2d/c \quad [\text{Equation 7}]$$

<Measuring Scheme 2>

The measuring scheme 1 is an example of transmitting the processing time point 850 and the reception time point 840 through separate signaling in the receiver 820. In contrast, the following example is an example of generating the same effect as a separate signaling by applying the phase difference to the distance measurement signal (e.g., reception signal) which is transmitted from the receiver 820 to the transmitter 810) without separately signaling the difference between the processing time point 850 and the reception time point 840. That is, it is possible to reflect the information $t_{s,RX}-t_{a,RX}$ obtained by the receiver 820 on the phase difference between two frequency components (i.e., w1 and w2) used for its distance measurement signal (i.e., the reception signal).

In detail, the receiver 820 sets the phases of the two frequency components (i.e., w1 and w2) in the distance measurement signal (i.e., the reception signal) transmitted by the receiver 820 itself to become different by the following values.

$$B = \arg\left(\frac{X_{RX}(w_2)}{X_{RX}(w_1)}\right) =$$ [Equation 8]

$$(w_2 - w_1)(t_{s,RX} - t_{a,RX}) = (w_2 - w_1)(t_{s,RX} - t_{s,TX} - d/c)$$

In this case, when the position of the receiver 820 is regarded as x=0, the signal may be shown as follows.

$$R(w_1, t, x=0) = A(0) * \exp(j*(w_1*(t - t_{s,RX} - n*t_{symb}) + \phi))$$

$$R(w_2, t, x=0) = A(0) * \exp(j*(w_2*(t - t_{s,RX} - n*t_{symb}) + B + \phi))$$ [Equation 9]

The signal arriving at the transmitter 810 at distance d from the receiver 820 is as follows. The time point at which this signal arrives at the transmitter is $t = t_{a,TX} = t_{s,RX} + n*t_{symb} + d/c$.

$$R(w_1, t, x=d) = A(d) * \exp(j*(w_1*t - w_1*t_{s,RX} - w_1*n*t_{symb} - k_1*d + \phi))$$

$$R(w_2, t, x=d) = A(d) * \exp(j*(w_2*t - w_2*t_{s,RX} - w_2*n*t_{symb} - k_2*d + B + \phi))$$ [Equation 10]

The transmitter 810 performs the FFT operation by multiplying the sinusoidal signal of initial phase 0 at $t = t_{s,TX} + (n+1)*t_{symb}$, which is also a quantized processing time point. The component w1 obtained at this time is as follows.

$$X_{TX}(w_1) =$$ [Equation 11]

$$R(w_1, t, x = d) * \exp(-j * w_1(t - t_{s,TX} - (n+1) * t_{symb})) =$$

$$A(d) * \exp(j * (w_1(t_{s,TX} - t_{s,RX} + t_{symb} - d/c) + \phi))$$

In the same manner, the w2 component can be calculated as follows.

$$X_{TX}(w_2) = A(d) * \exp(j*(w_2(t_{s,TX} - t_{s,RX} + t_{symb} - d/c) + B + \phi))$$ [Equation 12]

When the FFT result value calculated through Equation 11/12 is compared as follows, the distance d between the transmitter 810 and the receiver 820 may be measured.

$$\frac{X_{TX}(w_2)}{X_{TX}(w_1)} =$$ [Equation 13]

$$\frac{\exp(j * (w_2(t_{s,TX} - t_{s,RX} + t_{symb} - d/c) + B + \phi))}{\exp(j * (w_1(t_{s,TX} - t_{s,RX} + t_{symb} - d/c) + \phi))} =$$

$$\exp(j * ((w_2 - w_1)(t_{s,TX} - t_{s,RX} + t_{symb} - d/c) +$$

$$(w_2 - w_1)(t_{s,RX} - t_{s,TX} - d/c))) =$$

$$\exp(j * (w_2 - w_1)(t_{symb} - 2d/c))$$

The above-described equations are merely an example of applying the technique according to the present specification in a specific environment, and the content of the present specification is not limited to the above-described equations. An example of the present specification, for example, the measuring scheme 2 may be described in another format as follows.

The transmitter 810 receives a reception signal from the receiver 820. The reception signal includes a first reception component for the first frequency (i.e., w1) and a second reception component for the second frequency (i.e., w2). In addition, a phase difference set by the receiver may be applied between the phase of the first reception component and the phase of the second reception component. The phase difference is set based on a difference (for example, $t_{s,RX} - t_{a,RX}$) between the processing time point 850 and the reception time point 840 calculated by the receiver 820 through the transmission signal 830. The phase difference is also set based on the difference between the first frequency and the second frequency (i.e., w2−w1). An example of such a phase difference may be expressed by Equation 8 above.

The transmitter 810 processes signal processing (e.g., OFDM processing) at a quantized time point with respect to a reception signal to which a phase difference is applied. That is, the reception signal may be received at $t_{a,TX}$ and processed at $t_{s,TX}$. When the FFT operation is performed on the first frequency component and the second frequency component of the reception signal, a corresponding FFT value may be calculated, and examples of such FFT values are as shown in Equations 11 and 12. The transmitter 810 may calculate the final distance d by comparing the calculated FFT value.

The above-described measuring method 1 and measuring method 2 has the following advantages and disadvantages. First, the measuring scheme 1 is not limited to the usage in the transmitter 810 specified by the distance measurement signal (i.e., the reception signal) transmitted by the receiver 820 because in the signal itself, the receiver 820 generates two frequency components with the same phase without any restriction. Accordingly, this signal can be received by various transmitters and used for distance calculation. In this case, the receiver 820 should transmit information $t_{s,RX} - t_{a,TX}$ obtained for the distance measurement signal of each transmitter to each transmitter.

Measuring scheme 2 has the advantage that the receiver 820 can include the necessary information therein while transmitting a distance measurement signal (i.e., a reception signal) without separate information transmission, but since the distance measurement signal corresponding to the individual transmitter needs to be transmitted, the number of times of transmission of the distance measurement signal may increase.

The assumptions applied in explaining the principles described above may vary depending on the specific signal design (for example, whether or not the cyclic prefix is used in the OFDM signal and its length) or the synchronization scheme between the transmitter and the receiver, but applying the same principle to measure the distance is also possible.

The aforementioned distance measuring scheme can be used to measure the distance between different entities (e.g., a vehicle and/or an UE). That is, the distance between each other can be measured in a manner that different entities exchange transmission signals and reception signals. In addition, the schemes described above can also be used to measure direction, position, etc. between wireless communication systems. For example, a particular entity on the network (e.g., a vehicle and/or a UE) may measure the distance from another entity (e.g., a base station) of which the location is already known, and it is also possible to know its own exact absolute position.

The above-described distance measurement techniques can be initiated under specific conditions. For example, when the information value according to another positioning technique such as GPS exceeds a preset threshold value, the measuring scheme may be started. Further, the above-described measuring scheme may be started even when a precondition according to a communication standard such as 3GPP is satisfied. In addition, the above distance measuring scheme may be used in combination with an additional example described below. Possible examples are further described below.

Hereinafter, a method of measuring a distance between entities (e.g., vehicles) using a plurality of antenna groups and a beam forming scheme is proposed. It is possible to use the example of FIG. 8 in the process of measuring the distance between respective entities, and further refined distance measurement is possible through the proposed "antenna group and beam information".

Specifically, the following example may solve a problem that may occur when a large device such as an automobile measures a distance between each other through transmission and reception of a wireless signal, but the present disclosure is not limited to this example. In addition, the following example proposes an effective method in a situation of using a part of the antenna or beamforming when transmitting and receiving a radio signal used for distance measurement using a plurality of transmit and receive antennas.

Figure 9:
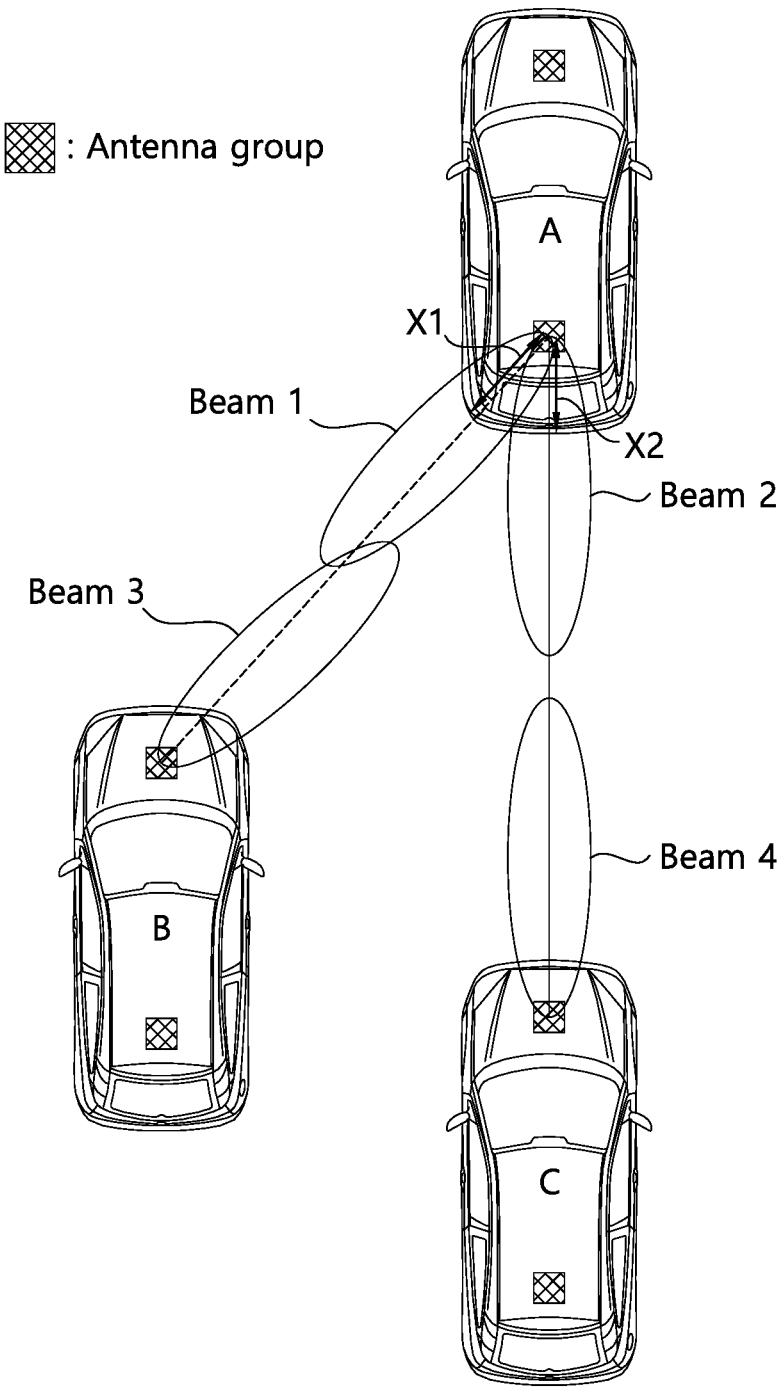
FIG. 9 illustrates a situation in which an example of the present specification may be applied.

FIG. 9 illustrates a situation in which an example of the present specification may be applied. The example of FIG. 9 is an example related to a vehicle, but as described above, examples of the present specification are not limited to the vehicle.

As shown, two antenna groups may be installed in a vehicle. By distributing a plurality of antenna groups in one vehicle, it is possible to solve the problem that the radio signal is blocked in the vehicle body. That is, one antenna group does not need to receive signals in all directions and transmit signals in all directions.

As illustrated, it is assumed that each antenna group is composed of a plurality of antenna elements and can perform beamforming to amplify a transmission/reception signal in a specific direction. FIG. 9 shows a case that the vehicle A transmits a distance measurement signal using an antenna group (for example, a first antenna group) installed at the rear side and uses beam 1 and beam 2, respectively. Vehicles B and C receive the signal of vehicle A by using the antenna group installed in front, and using beam 3 and beam 4, respectively. Although not specifically illustrated in FIG. 9, an antenna group (e.g., a second antenna group) installed in front of the vehicle A may also configure a plurality of transmission beams. It is also possible to communicate with either vehicle B or vehicle C via the transmission beam of this second antenna group.

Hereinafter, a specific example of "antenna group and beam information" is proposed. The antenna group and the beam information mean various pieces of information that are additionally necessary for a situation of measuring a distance between entities (vehicles). The antenna group and beam information may be signaled in advance or signaled in a distance measuring process between vehicles as in the following example.

The antenna group and beam information may include various information. For example, it may include at least one of 1) information about antenna-vehicle body distance, 2) information about radio resources (e.g., time/frequency/code resources) used for the transmission beam (e.g., the beam for transmitting the distance measurement signal), 3) information about a sequence (e.g., a bit sequence) used for a transmission beam (e.g., a beam for transmitting a distance measurement signal), 4) information about characteristics (e.g. antenna gain, direction, power) regarding the transmission beam, and 5) reference information used to generate a signal in a receiving vehicle (e.g., a mapping relationship between a transmitting beam in a transmitting vehicle and a receiving beam in a receiving vehicle, and a threshold power value for selecting a signal to be processed when a plurality of signals are received by the receiving vehicle). In addition, the information about the antenna-vehicle body distance may include all examples of various information related to the antenna and/or the vehicle body. For example, the information may include information about the relative position of the antenna from a particular reference point of the vehicle. In this case, the reference point may be, for example, the leftmost front point of the vehicle. In addition, the information may include information on the size (length, width, and/or height) of the vehicle as an example of the information about the vehicle. In addition, the information may include index and/or location information of the antenna group participating in the actual transmission.

The antenna group and the information elements included in the information may have a mapping relationship with each other. In addition, information on such a mapping relationship may also be indicated by one information element in the antenna group and beam information. For example, a particular antenna-body distance can be mapped to a particular radio resource and/or sequence or the like. Accordingly, the receiving entity (vehicle) that has obtained the antenna group and the information in advance may determine what antenna-vehicle body distance information should be used when a distance-specific signal is received through a specific resource/sequence or the like.

In view of the fact that a large number of specific entities (vehicles) travel in a large area, it is not desirable to exclusively allocate information such as specific resources/sequences for distance measurement between respective entities, and it is not desirable to fixedly determine the above-described mapping relationship. That is, it is preferable that the entity decides itself or dynamically determines a specific resource/sequence and the like in a manner that is scheduled through a higher entity (e.g., a base station) and dynamically determines a mapping relationship between respective information elements. However, the distance measurement between entities need be repeated in very short periods, whereas the information according to the antenna group and beam information need not be repeated in short periods. In consideration of this point, the following example is proposed.

An example of the antenna group and the beam information including the information on the antenna-vehicle body distance will be described below.

In measuring the distance between vehicles, the information that is really important may be the distance between the vehicle bodies. However, the distance obtained by the signal transmission through the antenna is a distance between the antennas, which does not correspond to the distance between the vehicle bodies, and this problem may be increased especially when the accuracy of measurement of position between vehicles is required to be 1 m or less. Also, as shown in FIG. 9, if a plurality of antenna groups are installed in different positions in a vehicle and the beam used varies according to the situation, the distance between the antenna and the vehicle body also varies according to the beam. Specifically, in FIG. 9, when the vehicle A transmits the distance measurement signal through the beam 1, the distance between the antenna and the vehicle body is approximately X1, but when the vehicle A transmits the distance measurement signal through the beam 2, the distance between the antenna and the vehicle body is approximately X2, and the condition X1>X2 is established.

In the above situation, for more accurate distance measurement, it is preferable that the antenna group and beam information including the information on the antenna-vehicle body distance are signaled.

First, each vehicle may operate so that the distance measurement signals transmitted through different antenna groups and/or different beams may be transmitted using different time/frequency resources, or may use different sequences, to thereby allow mutual distinction. In this process, information on time/frequency/sequence and the like is mapped to information on the antenna-vehicle body distance, and information on the mapping relationship is preferably included in the above-described antenna group and beam information.

For example, in the example of FIG. 9, the distance measurement signal transmitted through the beam 1 and the distance measurement signal transmitted through the beam 2 in the first antenna group may be divided in time/frequency resources or sequences used. Each vehicle may inform the neighbor vehicles of information on the distance between the antenna and the vehicle in the advancing direction of the distance measurement transmission signal defined as a specific time/frequency resource or sequence, in the form of the above-described antenna group and beam information.

Information on the antenna group and beam information (e.g., information about the antenna-vehicle body distance) can be dynamically changed, so that it can be conveyed to surrounding vehicles in advance through relatively long periods of inter-vehicle messages. When each neighbor vehicle receives a distance measurement signal through a specific time/frequency/sequence, each neighbor vehicle may determine the distance between the antenna and the vehicle body in the transmitting vehicle in the corresponding direction based on the corresponding information.

Figure 10:
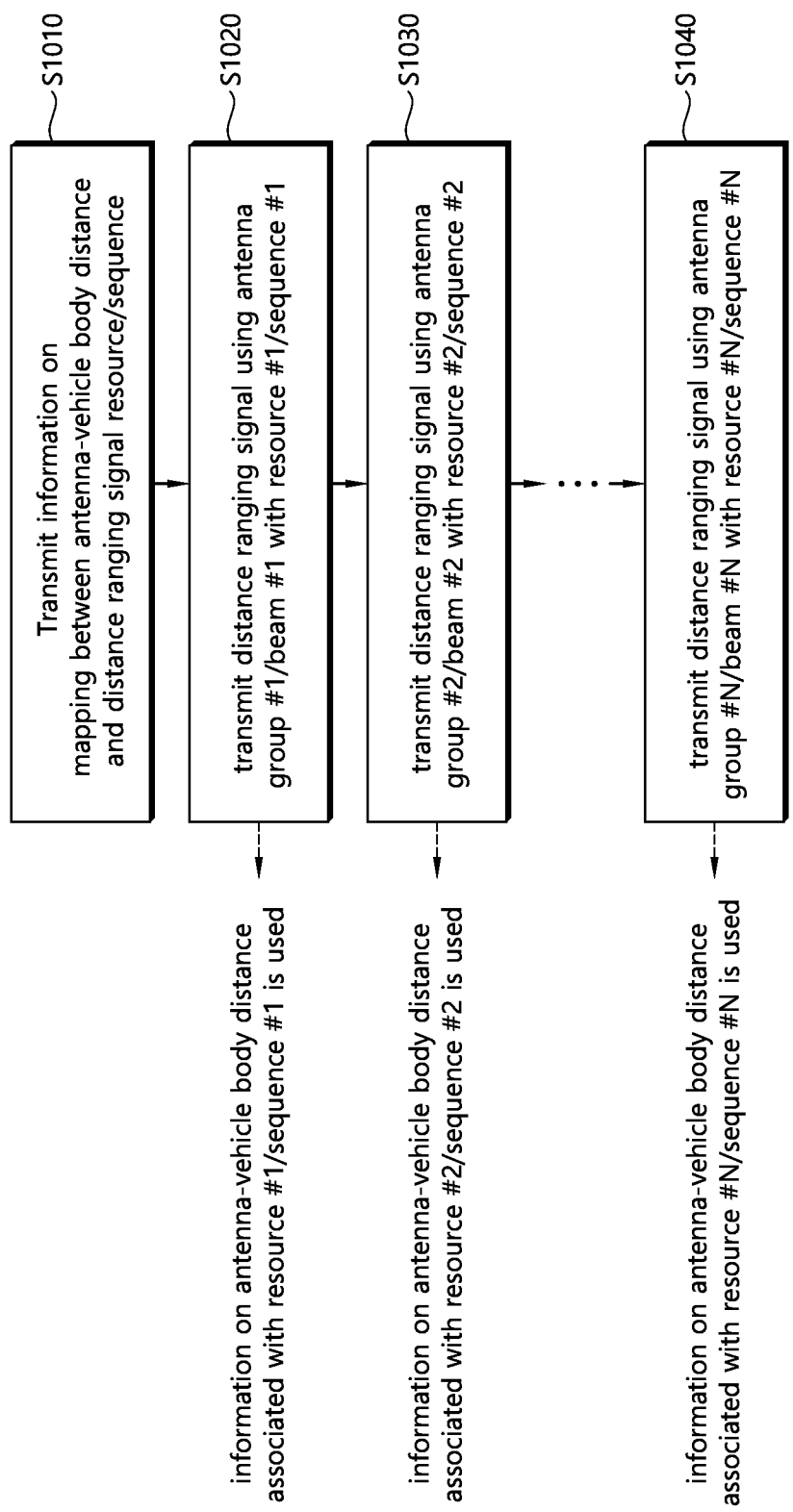
FIG. 10 illustrates an example of first transmitting antenna group and beam information, and then measuring distance between vehicles through a distance measurement signal.

FIG. 10 illustrates an example of first transmitting antenna group and beam information, and then measuring distance between vehicles through a distance measurement signal. As shown, information about the antenna-vehicle body distance and information about the mapping between the distance measurement signals are transmitted first. Thereafter, the vehicle receiving the distance measurement signal may obtain information about the corresponding antenna-vehicle body distance through the time/frequency/sequence in which the distance measurement signal is used. FIG. 10 illustrates an example related to a situation in which information on antenna-vehicle body distance is mapped to information on the mapping, but the mapping relationship between the antenna group and the individual information elements included in the beam information may be variously set.

Figure 11:
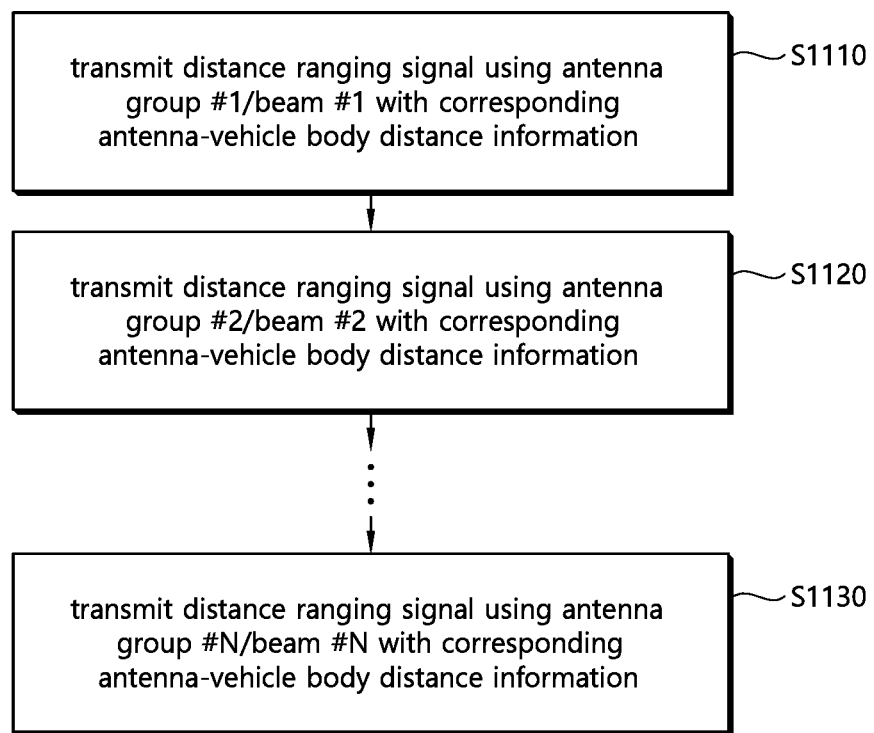
FIG. 11 shows a modified example of FIG. 10.

FIG. 11 shows a modified example of FIG. 10. According to FIG. 11, the vehicle may transmit information on the antenna-vehicle body distance in consideration of the antenna group and the transmission beam used for the transmission while transmitting the distance measurement signal. In the example of FIG. 11, the mapping between the information on the antenna-vehicle body distance and the time/frequency/sequence may not be applied. In other words, it is not necessary to use an associated time/frequency/sequence to transmit a distance measurement signal using a specific antenna group and beam, and it is possible to change time/frequency/sequence dynamically.

Figure 12:
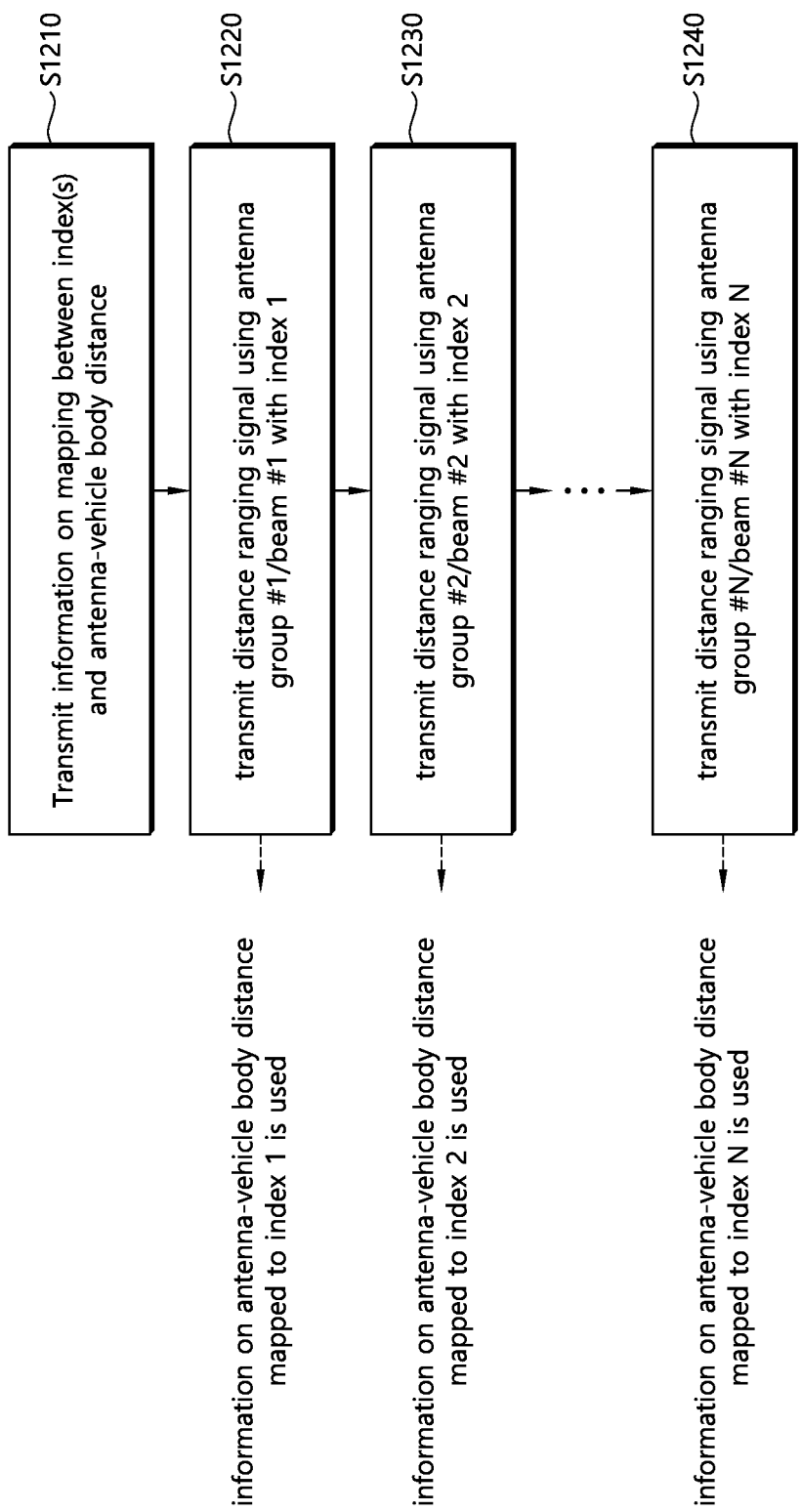
FIG. 12 shows a modified example of FIG. 10.

FIG. 12 shows a modified example of FIG. 10. According to FIG. 12, it is possible to link an index specified in advance to all or a part of information included in the antenna group and the beam information, and transmit the index together at each time when the distance measurement signal is transmitted.

As another example, when the transmission vehicle uses a specific beam, the transmission timing of the distance measurement signal may be adjusted according to the distance between the antenna and the vehicle body corresponding thereto. For example, referring to FIG. 9, when the vehicle A transmits to beam 1, the distance measurement signal is transmitted at a point in time ahead of the time required for the signal to travel by the distance X1 based on a predetermined point in time, but in the case of transmission to beam 2, the distance measurement signal may be transmitted at a point in time preceding the time required for the signal to progress by the distance X2. In this case, the receiving vehicle always seems to start transmitting the distance measurement signal at the edge of the vehicle body at a predetermined point of time, thereby solving the problem that the distance between the antenna and the vehicle body is different for each antenna group and/or beam without additional signaling. On the other hand, as described above, the information on the antenna-vehicle body distance may include information about the relative position of the antenna from a specific reference point of the vehicle. In this case, the adjustment of the transmission time point of the distance measurement signal (first distance measurement signal) may be determined in consideration of the reference point. That is, the transmission time point can be adjusted so that the transmission in each antenna provided in the vehicle appears to be transmitted from a reference point. In detail, the transmission may be performed by delaying the time it takes for the signal transmitted from the reference point to reach the corresponding antenna.

The receiving vehicle, which has received the distance measurement signal from the transmitting vehicle, also determines the distance between the antenna and the vehicle body in consideration of the antenna group which received the signal and the beam used for the reception. The distance between the vehicle bodies may be finally measured by using the distance between the antennas obtained through the above process and the antenna-body distance information of the transmitting vehicle.

The operations described with reference to FIGS. 9 to 12 may be applied even in a situation in which distance measurement between antennas is possible as soon as a signal transmitted by a transmitting vehicle is received. That is, the examples of FIGS. 9 to 12 may be applied when a transmitting/receiving vehicle is connected to a satellite and mutual synchronization is well established, and accordingly, the distance between antennas is measured based on the time spent until a signal transmitted at a predetermined time is received. However, if mutual synchronization is not maintained, the receiving vehicle does not know when the distance measurement signal was transmitted and accordingly the receiving vehicle may retransmit the regression signal at its reception time or a predetermined specific time point derived therefrom, and the transmitting vehicle may measure the distance by calculating a round trip time between two vehicles based on the arrival time of the regression signal.

Figure 13:
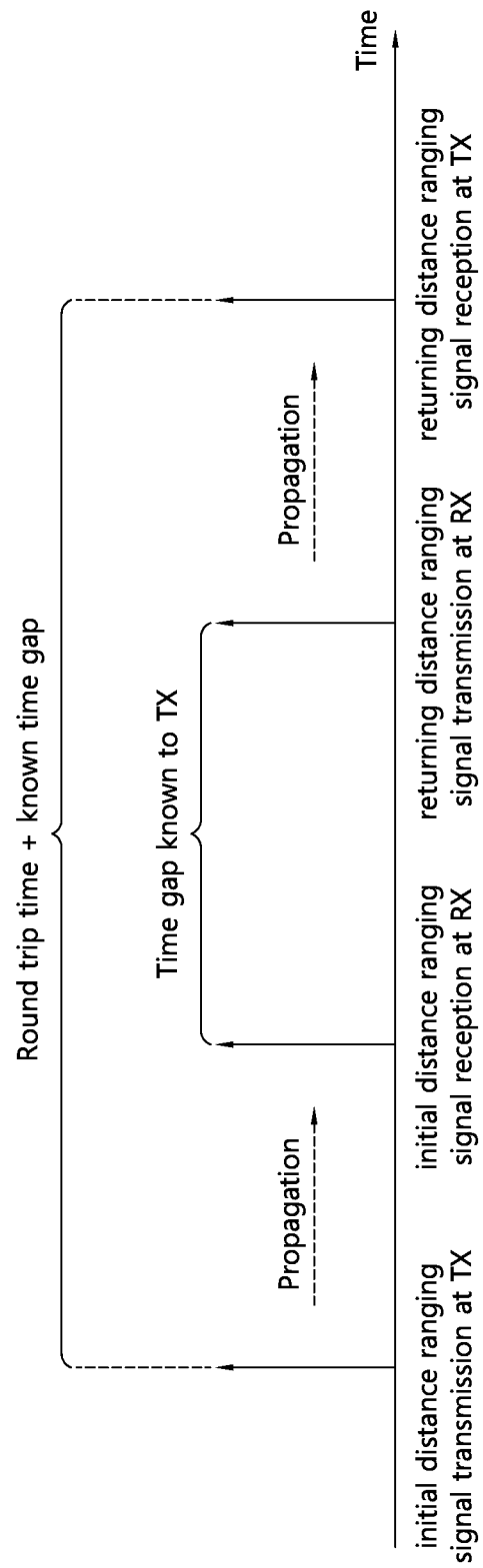
FIG. 13 illustrates an example of measuring a round trip time between two vehicles based on a regression signal transmitted from a receiving vehicle.

FIG. 13 illustrates an example of measuring a round trip time between two vehicles based on a regression signal transmitted from a receiving vehicle.

In this case, the receiving vehicle (a vehicle receiving the first distance measurement signal and transmitting a regression signal thereof) does not need to know information about the antenna-vehicle body distance from the transmitting vehicle (the vehicle transmitting the first distance measurement signal). This is because the final distance between vehicle bodies is calculated by the transmitting vehicle.

However, in order to for the transmitting vehicle to calculate this, information on the antenna group when the receiving vehicle transmits the regression signal and the antenna-vehicle body distance corresponding to the beam is required. To this end, information on antenna-vehicle body distance and mapping of time/frequency/sequence in the antenna group and beam information may be applied. When such mapping information is shared in advance, the receiving vehicle may use a time/frequency/sequence mapped to the antenna group/beam while transmitting a regression signal through the antenna group and the beam that received the initial signal. This example may be understood to be similar to the example of FIG. 10 described above.

Alternatively, antenna-vehicle body distance information corresponding to the antenna group and beam used for each regression signal transmission may be reported. This example may be understood to be similar to the example of FIG. 11 described above.

Alternatively, as described above, an index may be assigned to each antenna group and beam combination, and antenna-vehicle body distance information for each combination may be informed in advance, and then a corresponding index may be informed at every regression signal transmission. This example may be understood to be similar to the example of FIG. 12 described above.

Alternatively, when transmitting the regression signal, it is based on a specific point in time determined from the time of receipt of the first distance measurement signal, and the regression signal may be transmitted at a point in time that advances the distance between the antenna and the vehicle body corresponding to the antenna group and beam used for transmission, thereby exhibiting the effect as if the regression signal (not the end of the antenna) is transmitted at the end of the body.

Hereinafter, a method of selecting an antenna group and a beam for the above regression signal will be described.

When the receiving vehicle receives the initial distance measurement signal and transmits a regression signal thereto, the antenna group and the beam to be used for the regression signal transmission should be determined. Basically, when the receiving vehicle receives a specific initial distance measurement signal through a specific beam of a specific antenna group, the receiving vehicle may operate to transmit a corresponding regression signal using the same antenna group and beam. This allows the bidirectional link between the transmitting vehicle and the receiving vehicle to use the same antenna group and beam so that the round trip time can be accurately calculated.

Even when the transmitting vehicle transmits a specific initial distance measurement signal in one antenna group and beam combination, the receiving vehicle may receive the same signal through different beams or antenna groups. In this case, the receiving vehicle can transmit the regression signal by selecting the antenna group and the beam with the strongest signal, so that a single regression signal transmission can measure the distance on the path between the most dominant transmitting and receiving vehicles. Alternatively, the receiving vehicle uses a plurality of antenna groups and beams that receive a signal at a predetermined level or more, or are received at a predetermined ratio or more with respect to the strongest size signal, or are included within a predetermined number in a reception signal size order, to thereby transmit a regression signal. In this way, the transmitting vehicle can measure the distance for each of the multiple paths that can be formed between specific receiving vehicles, and by combining them properly, the final inter-vehicle distance can be more accurately calculated, or the future inter-vehicle distance can also be estimated by using the speed/direction information of the transmitting/receiving vehicle. At this time, the receiving vehicle transmits the regression signal together with information on the antenna group used to transmit the regression signal and the receiving intensity of the initial distance measurement signal received from the beam, and accordingly, a greater weight may be applied to the calculated values in the antenna group and the beam where the signal reception was strong when a transmitting vehicle combines round trip times based on each regression signal. This reception intensity information may be known through separate signaling (for example, may be signaled through the above-described antenna group and beam information), or may be indirectly measured by setting the power used by the receiving vehicle to transmit the regression signal to be proportional to the reception power of the corresponding initial distance measurement signal (signal transmitted from the transmitting vehicle).

If a case that the antenna group and the beam in which the receiving vehicle receives the initial distance measurement signal differ from the antenna group and the beam used for the regression signal correspondingly transmitted, the information thereabout should also be transmitted to the transmitting vehicle. This is possible by extending the information on the combination of the antenna group and the beam used as described above to a combination of information used to receive the first distance measurement signal at the receiving vehicle side and information used to transmit the regression signal. For example, as described above, when the information on the antenna group and the beam combination is transmitted based on the index, it may be used to refer to the use of one index for receiving the first distance measurement signal and the other for regression signal transmission while delivering two indexes. In particular, such a case may be utilized when a transmission capability and a reception capability do not match in a vehicle antenna implementation, and it may be utilized when, for example, in a specific antenna group, only reception is possible and transmission is not possible, or the number of antenna elements that can be simultaneously used for reception in a specific antenna group is different from the number that can be simultaneously used for transmission.

On the other hand, when the transmitting vehicle transmits the first distance measurement signal for itself using a plurality of antenna groups and beams, the receiving vehicle also receives the first distance measurement signal from the same transmitting vehicle through the plurality of antennas and beams. Even in this case, the regression signal may be transmitted based on the above-described scheme. For example, the regression signal may be transmitted once in accordance with the antenna group and the beam received with the strongest size. Alternatively, the regression signal may be transmitted several times in accordance with a plurality of antenna groups and beams meeting the conditions described in the above embodiments, and in this case, information on the received power of the first distance measurement signal may also be included.

Meanwhile, depending on the implementation of the antenna, antenna gains may be different between different antenna groups or between different beams formed in the same antenna group. For example, the gain between the main lobe and the sieve lobe may be different within one antenna group. In addition, the gain between different antenna groups may be different.

In this case, if the receiving vehicle attempts to make a distance measurement based on the magnitude of the received power or decides the antenna group and beam to transmit the regression signal, in practice, this may result in measuring the distance in a direction other than the strongest path on the channel path (for example, the path the signal travels through the line of sight without reflection or diffraction). To prevent this, information (e.g., the above-described antenna group and beam information) that is shared in advance or transmitted with the distance measurement signal may include antenna gain when transmitted through a specific antenna group and beam. The receiving vehicle may perform the above-described operation based on the corrected received power. Alternatively, the transmission power of the initial distance measurement signal and the regression signal can be adjusted in consideration of the difference in the antenna gain during transmission. For example, this transmit power regulation can be operated to allow the same power to always be sent in the direction the transmission is directed when transmitted through any antenna group and beam (that is, if the antenna gain of a specific antenna group/beam is low, the transmit power is increased by that amount, and if the antenna gain is high, the transmit power is decreased by that amount).

Specific examples described above may be implemented through various devices. For example, it may be implemented by hardware, firmware, software, or a combination thereof.

Hereinafter, PDOA will be described in more detail.

<Phase Difference of Arrival (PDOA)>

1. Relationship Between Distance and Signal Phase

A range is a factor that is mainly influenced by hardware components and less influenced by phase difference of arrival (PDOA), which is a localization principle of a radio frequency identification (RFID) system. When localized in units of PDOA, the distance mainly depends on a wavelength and a starting phase of a signal emitted from the antenna, and overflows occur in a stage. This does not allow clear identification of objects within these ambiguous areas. For a single antenna, a formula for calculating d for a phase $\varnothing$ is as follows.

$$d = \frac{\lambda}{2}\left(\frac{\varnothing}{2\pi} + n\right) \quad \text{[Equation 14]}$$

where d is a distance between a reader antenna and a tag, $\lambda$ is a wavelength, $\varnothing$ is a phase difference between a transmission signal and a reception signal, and n is a positive number. Equation 1 shows that a distance from the reader side to the transponder side is a multiple of $\lambda/2$ regardless of the phase change. The phase changes according to the distance, but in this case, distance calculation is impossible by Equation 15.

$$\varnothing = \varnothing_{int} + \varnothing_{prop} \quad \text{[Equation 15]}$$

where $\varnothing$ is a phase of the signal, $\varnothing_{int}$ is an internal phase in the tag, and $\varnothing_{prop}$ is a signal propagation phase. The parameter $\varnothing_{int}$ cannot be calculated. However, when two different frequencies of the tag are used, a value of $\varnothing_{int}$ will be removed.

2. PDOA Based Range Estimation

A PDOA based approach shares the same concept as that of dual-frequency technology for range estimation applied to radar systems. That is, a signal having two fundamental frequencies is used, and the phase difference observed at the two frequencies is used for estimating a range of a reflective object. A situation is considered where the RFID reader transmits two continuous-wave signals (CW signals) at frequencies $f_1$ and $f_2$. When modulation and receiver noise performed in the RFID tag are not considered, a phase of an uplink signal at a frequency $f_i$ may be represented by Equation 3.

$$\varnothing_i = 4\pi f_i d/c \quad \text{[Equation 16]}$$

where i=1, 2, c is an RF signal propagation speed $3 \times 10^8$ m/s, and d is a distance between a reader and a tag. Therefore, the range d may be estimated from the phase difference observed in a return signal corresponding to two frequencies. In practice, phase observation is a wrapping target. That is, a phase at each frequency may be observed only within the range of Equation 4.

$$0 \leq \varnothing_i < 2\pi \quad \text{[Equation 17]}$$

Consequently, the tag range is estimated like Equation 18.

$$\hat{d} = \frac{c\Delta\varnothing}{4\pi(f_2 - f_1)} + \frac{cm}{2(f_2 - f_1)} \quad \text{[Equation 18]}$$

$$0 \leq \Delta\varnothing = \varnothing_2 - \varnothing_1 < 2\pi \quad \text{[Equation 19]}$$

where $\Delta\varnothing$ is wrapped phase difference observation and has a range of Equation 6. m is an unknown integer. A second term in Equation 5 represents range ambiguity due to phase wrapping. Because backscattering modulation changes a signal phase at two carrier frequencies in the same manner, Equation 5 is valid when backscattering modulation is applied. A maximum unambiguous range is as illustrated in Equation 20.

$$d_{max} = c/2|f_2 - f_1| \quad \text{[Equation 20]}$$

3. Multi-Frequency Based Range Estimation

Range estimation of a PDOA method based on dual frequency signaling may be difficult in other situations. One of important limitations is trade-off between a maximum unambiguous range and sensitivity of range estimation to noise. That is, large separation between two frequencies may reduce sensitivity of range estimation to additional noise, but by doing this, a small unambiguous range that may not be fully large for RFID systems and applications of interest is calculated. Another problem is that when a signal is severely blurred at either or both of two carrier frequencies, an unreliable phase is obtained, and then occurs when estimating a range for a received signal. The use of three or more carrier frequencies may overcome this problem and improve accuracy of the phase difference through appropriate data fusion in different frequency pairs. As a result, estimation of the tag range can be improved. Because different frequency pairs may have various range estimation qualities, it is preferable to have a weighted average of range estimation rather than a simple average. In general, there are three important issues related to multi-frequency based range estimation; weighted fusion of range estimation in multi-frequency signaling systems, selection of frequencies, and range estimation obtained from different frequency pairs.

4. Direction of Arrival (DOA) Estimation

There is a one-to-one relationship between a signal direction and an associated received steering vector. Therefore, it should be possible to reverse the above relationship and estimate a direction of a signal from a received signal. Therefore, an antenna array should be able to provide arrival direction estimation. Further, there is a Fourier relationship between the beam pattern and excitation at the array. This makes a DOA estimation problem equivalent to spectral estimation.

Hereinafter, the problem of DOA estimation will be described with reference to FIG. 14.

Figure 14:
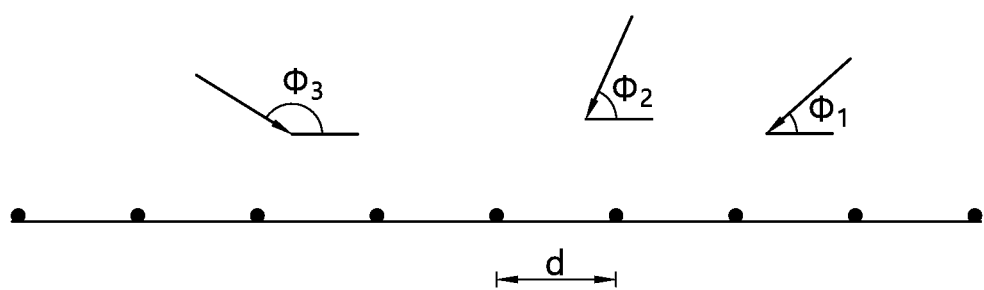
FIG. 14 schematically shows an example of the problem of DOA estimation.

FIG. 14 schematically shows an example of the problem of DOA estimation.

A preset problem is illustrated in FIG. A. The multiple (M) signals have the N number of elements and each collides in a linear and equal spaced array and having a direction $Ø_i$. A goal of DOA estimation is to estimate $Ø_i$ using data received in the array. Here, i=1, . . . M. It is generally M<N, but it is assumed that there is an approach that does not have this limitation (e.g., maximum likelihood estimation). In practice, it is difficult to estimate by the fact that the unknown number of signals in an unknown direction and unknown amplitude collide with an array at the same time. Further, the received signal is always damaged by noise. Correlation, maximum likelihood, MUSIC, ESPRIT, and matrix pencil may be used for DOA estimation.

Hereinafter, the present disclosure will be described.

The following proposed methods suggest an efficient (transmission) resource selection method of transmitting a distance measurement signal between wireless communication devices with high reliability and short delay.

Proposed methods of the present disclosure may assume a situation in which a device to be a target for measuring distances measures distances using phase information of radio signals transmitted and received. Further, in the present disclosure, it is assumed that a signal is transmitted/received by characteristically using two frequencies (or tones), but the principle of the present disclosure may be applied in an extended manner to a situation in which the number of frequencies (or tones) used for transmission and reception is generalized instead of two.

Further, the present disclosure assumes a situation in which a plurality of frequencies (or tones) are transmitted simultaneously, but it is also possible to extend and apply the principles of the present disclosure in consideration of transmission of a plurality of frequencies (or tones) at different predetermined time points.

Further, in the present disclosure, it is assumed that a two-way ranging (e.g., a method in which a receiver, having successfully received a signal of a transmitter feeds back, and the transmitter estimates a distance using a phase difference between a transmission signal and a feedback signal) situation, but the principles of the present disclosure may be applied in an extended manner to a case in which various ranging techniques are applied.

Further, the term "setting (or defining)" in the present disclosure may be interpreted in an extended manner as "the network is designated through predefined (physical layer/high layer) signaling (e.g., to designate through a RADIO RESOURCE CONTROL (RRC) signal, SYSTEM INFORMATION BLOCK (SIB))" and/or to "designated/determined (implicitly) according to a predefined rule" with a higher layer signal. The term "transmitter" (and/or "receiver") in the present disclosure may be interpreted in an extended manner to "(no mobility) eNB (or ROAD SIDE UNIT (RSU) or RELAY NODE)" and/or "(mobile) vehicle (or UE) (e.g., a UE installed in a vehicle, pedestrian UE of a pedestrian).

The term "transmitter (or receiver)" in the present disclosure may be interpreted in an extended manner to a "receiver (or transmitter)". Further, in the present disclosure, the term "frequency (or tone)" (related to ranging signal transmission) may be extended in an extended manner to a preset number of "subcarrier(s)" and/or "RESOURCE BLOCK (RB)", etc.

Further, the term "sensing" in the present disclosure may be interpreted in an extended manner to a reference signal received power (RSRP) measurement operation of a "sequence" of a (successfully received) distance measurement signal and/or a "reference signal (or sequence)" used for demodulation/decoding of (together transmitted) data (or payload)" or a preset resource unit (e.g., sub-channel) based received signal strength indication (RSSI) measurement operation.

Hereinafter, the following abbreviations (or terms) may be used for convenience of description. As an example, REQ_SIG and/or REP_SIG may be defined in a combination form of "reference signal (or sequence) and data (or payload)" (e.g., may be transmitted through a continuous frequency resource of a preset size) and/or in the form of "sequence". A reference signal (or sequence) in an electronic format may be used for demodulation/decoding purposes (e.g., channel estimation) of (together transmitting) data (or payload) as well as distance estimation between transceivers. Further, in the present disclosure, the term "reception success" may be interpreted as (REQ_SIG/REP_SIG related) "sequence (or reference signal) detection success" and/or "(together transmitting) data (or payload) demodulation/decoding success".

A signal transmitted by the transmitter (for distance measurement) may hereinafter be referred to as a ranging request signal (REQ_SIG). A response (/return) signal transmitted by a receiver, having successfully received the REQ_SIG may be referred to as a ranging response signal (REP_SIG).

When selecting a transmission resource related to the REQ_SIG and/or the REP_SIG, the minimum factor (/side) to be considered may be as follows.

(Factor #1) Half Duplex Problem.

For example, due to hardware limitations or magnetic interference, a wireless communication device cannot simultaneously perform transmission/reception operations at the same time point. In this case, it is referred that the wireless communication device operates in half duplex. A device for supporting only half duplex cannot receive other signal while transmitting a signal at the same time point. However, full duplex means that it is possible to simultaneously perform a transmission/reception operation at the same time point. In the case of a device for supporting only half duplex, signal transmission and reception may be more limited than that of a device for supporting full duplex.

For example, after having successfully received an REQ_SIG of a specific transmitter, when the receiver transmits an REP_SIG for the REQ_SIG to the transmitter, the transmitter should not select at least a resource at a time point at which the transmitter performs a transmission operation. Otherwise, the transmitter may not receive the REP_SIG, and it is impossible to or difficult to finally estimate a distance between the transceivers.

(Factor #2) A Transmission Overhead Problem of REP_SIG of the Receiver (or REQ_SIG of the Transmitter) (or Transmission Related CONGESTION CONTROL Problem of REP_SIG (or REQ_SIG))

For example, when the receiver transmits REP_SIG for all REQ_SIGs that have been successfully received, the chance of receiving REQ_SIG may relatively decrease due to a half-duplex problem, or a congestion level may increase due to excessive REP_SIG transmission.

(Factor #3) Collision/Interference Problem Between Transmission Resources of REQ_SIG or REP_SIG Example When REQ_SIG transmission resources between different transmitters (or REP_SIG transmission resources between different receivers) do not overlap (to the maximum), reliability of the corresponding signal may be guaranteed.

(Factor #4) Latency Problem in Transmission of Received Successfully REQ_SIG and (Linked) REP_SIG For example, considering transmitter/receiver mobility and/or channel change on a time domain, transmission as quickly as possible of REP_SIG for received successfully REQ_SIG may be helpful for improving distance measurement reliability (or performance).

Considering the above-described (some) factor (/side), the following (some) (transmitting) resource selection method may be applied to transmit a distance measurement signal with high reliability/short delay. Here, the following (some) methods may be limitedly applied only when a (transmitting) resource is selected based on sensing.

Two methods may be provided for a method in which a UE measures a distance to another UE. As one of the methods, a one-way ranging method may be provided, and as another method, a two-way ranging method may be provided.

Among them, when a UE transmits a specific signal (e.g., ranging request signal) to another UE and receives a response signal (e.g., ranging response signal) to the specific signal from another UE in response to the specific signal, the two-way ranging method may mean a method in which the UE measures a distance between the UE and the another UE using a phase. For convenience in understanding this, a method in which a UE measures a distance to another UE will be described with reference to the drawings.

Figure 15:
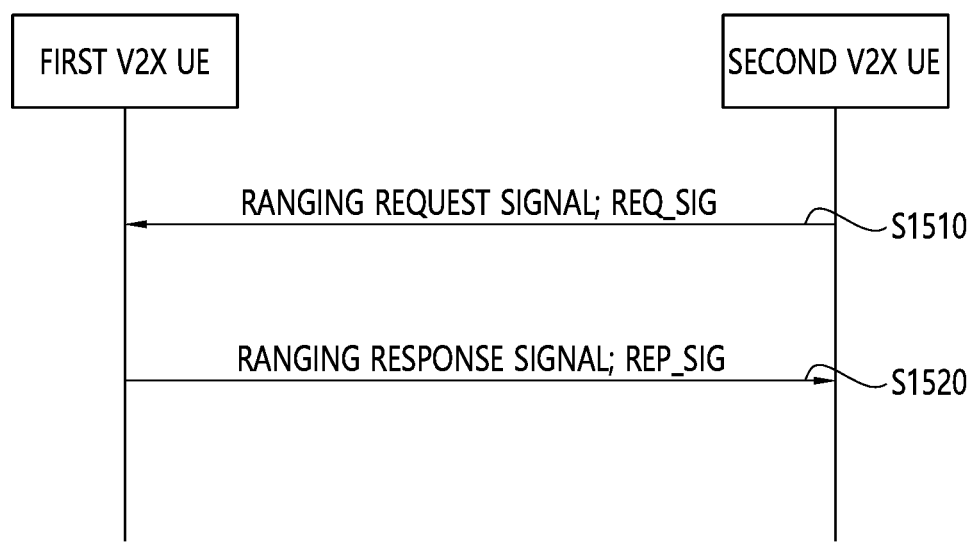
FIG. 15 is a flowchart of a distance measuring method according to two-way ranging that can be applied in the present disclosure.

FIG. 15 is a flowchart of a distance measuring method according to two-way ranging that can be applied in the present disclosure.

Referring to FIG. 15, a first UE (hereinafter, for convenience of description, a 'first UE' and 'first V2X UE' may be used together) may receive a ranging request signal from a second UE (hereinafter, for convenience of description, a 'second UE' and 'second V2X UE' may be used together) (S1510).

Thereafter, the first UE may transmit a ranging response signal as a response to the ranging request signal to the second UE (S1520). In this case, the second UE may estimate a distance using a phase difference based on the ranging response signal received from the first UE.

[Proposal Method #1] As an example, the receiver may use (/select) REP_SIG resources (/pool) at different time points according to a REQ_SIG received power level (range) for REP_SIG transmission(s) of (a plurality of) REQ_SIGs successfully received (at a specific time point).

Figure 16:
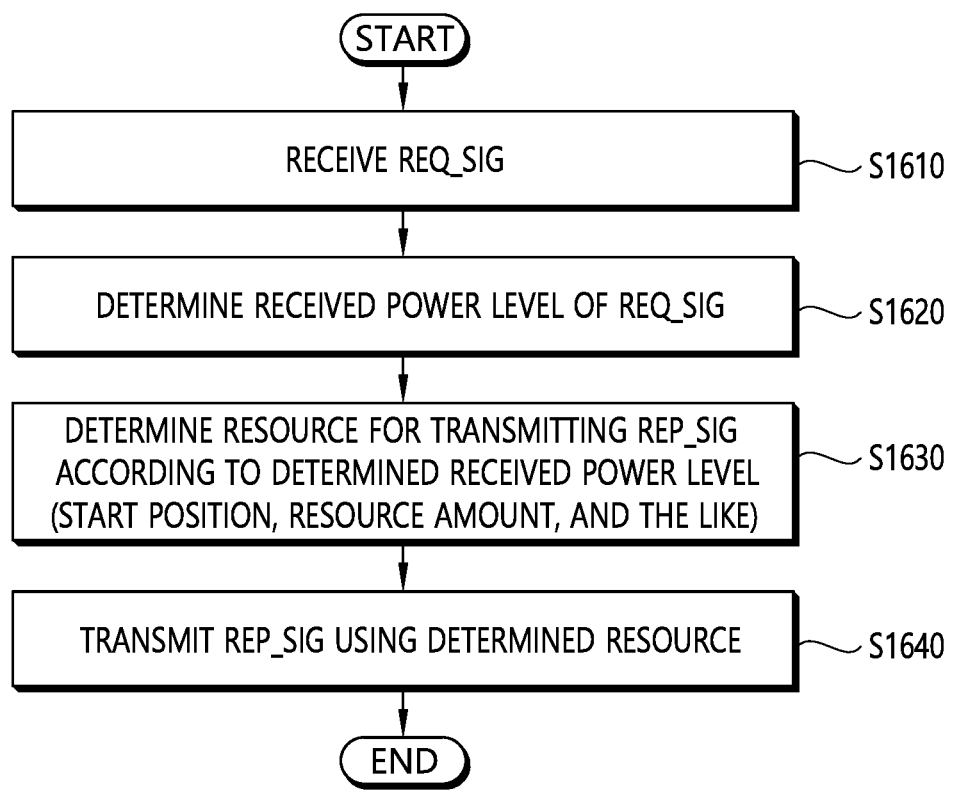
FIG. 16 illustrates a method of transmitting a ranging response signal according to a proposed method #1.

FIG. 16 illustrates a method of transmitting a ranging response signal according to a proposed method #1.

Referring to FIG. 16, a UE receives a ranging request signal REQ_SIG (S1610). The UE determines a received power level of the ranging request signal (S1620), and determines a resource for transmitting a ranging response signal REP_SIG according to the determined received power level (S1630). For example, the UE may determine a start position (time point) of a resource for transmitting a ranging response signal REP_SIG, a resource amount, and the like. The UE transmits a ranging response signal using the determined resource (S1640).

The received power may be interpreted as an RSRP measurement value for a "sequence" of (receiving successfully) REQ_SIG and/or a "reference signal (or sequence) used for demodulation/decoding of (together transmitted) data (or payload)".

Figure 17:
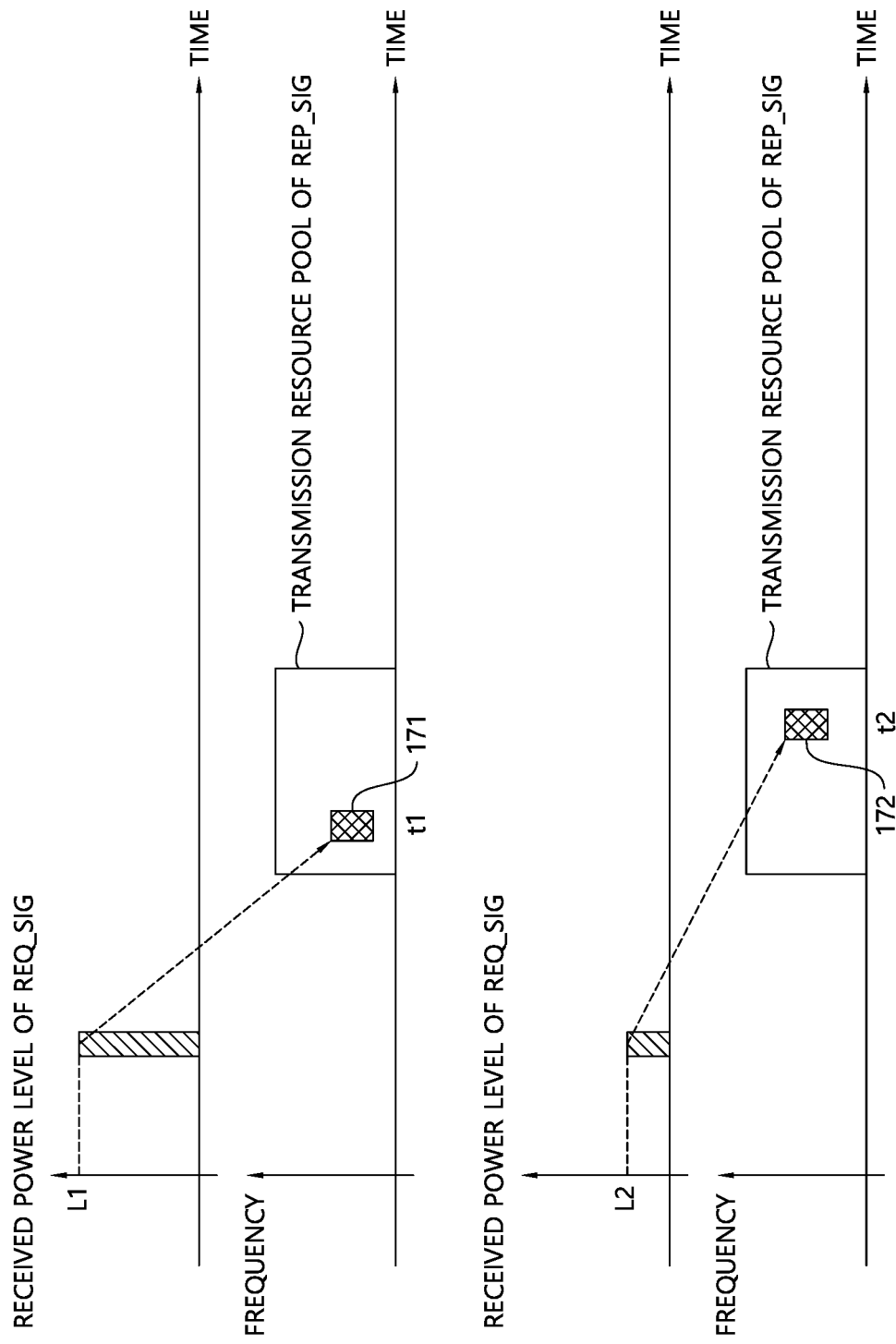
FIG. 17 is a diagram conceptually illustrating an example of a method of transmitting a ranging response signal according to a proposed method #1.

FIG. 17 is a diagram conceptually illustrating an example of a method of transmitting a ranging response signal according to a proposed method #1.

Referring to FIG. 17, the UE received a ranging request signal REQ_SIG, and when a received power level thereof is L1, the UE may transmit a ranging response signal REP_SIG using the first resource 171 located at a time t1 in a transmission resource pool of the ranging response signal REP_SIG.

However, the UE received the ranging request signal REQ_SIG, and when a received power level thereof is L2, the UE may transmit a ranging response signal REP_SIG using a second resource 172 located at a time t2 in the transmission resource pool of the ranging response signal REP_SIG.

Figure 18:
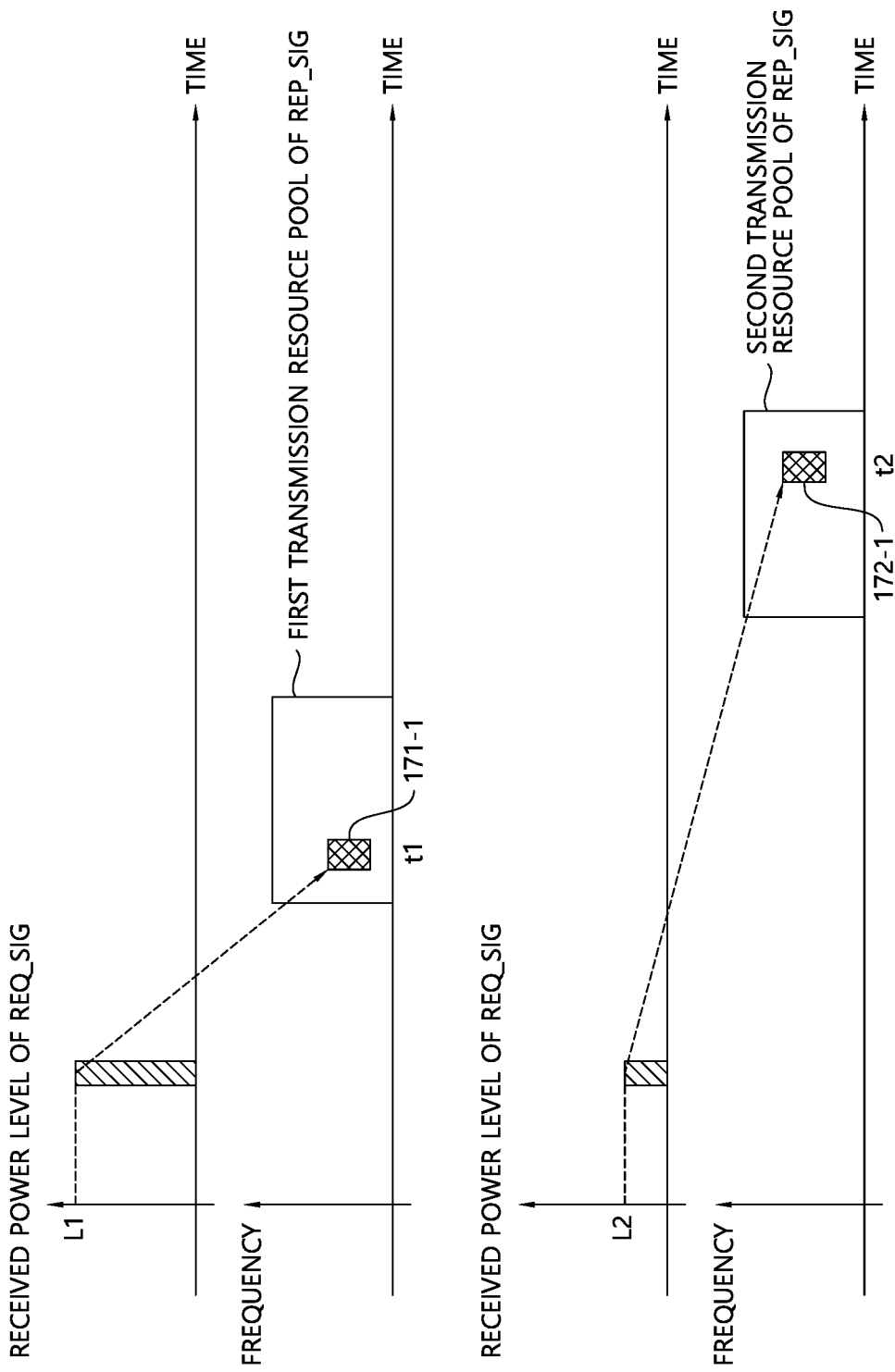
FIG. 18 is a diagram conceptually illustrating another example of a method of transmitting a ranging response signal according to a proposed method #1.

FIG. 18 is a diagram conceptually illustrating another example of a method of transmitting a ranging response signal according to a proposed method #1.

Referring to FIG. 18, the UE received the ranging request signal REQ_SIG, and when a received power level thereof is L1, the UE may transmit a ranging response signal REP_SIG using a first resource 171-1 located at a time t1 in the first transmission resource pool of a ranging response signal REP_SIG.

However, the UE received the ranging request signal REQ_SIG, and when a received power level thereof is L2, the UE may transmit a ranging response signal REP_SIG using a second resource 172-1 located at a time t2 in a second transmission resource pool of the ranging response signal REP_SIG. Here, the first transmission resource pool and the second transmission resource pool may be in a time division multiplexing (TDM) relationship. Here, the first transmission resource pool may be ahead of the second transmission resource pool in time.

However, in FIG. 18, an example of selecting a transmission resource of a ranging response signal within a first transmission resource pool ahead of time when the received power level of the ranging request signal is relatively high (L1 at L1>L2) has been described, but it is not necessarily limited thereto. That is, when the received power level of the ranging request signal is relatively high (L1), the UE may select the transmission resource of the ranging response signal in the second transmission resource pool lagged behind in time. Similarly, when the received power level of the ranging request signal is relatively low (L2), the UE may select the transmission resource of the ranging response signal in the first transmission resource pool that is ahead of time.

In the example of FIG. 18, according to the received power level of the ranging request signal, one transmission resource pool may be selected from different transmission resource pools that are TDM, and a transmission resource for transmitting a ranging response signal may be selected in the transmission resource pool. However, in the example of FIG. 17, according to the received power level of the ranging request signal, there is a difference in which one of the transmission resources that are TDM is selected in the same transmission resource pool.

When the above rule is applied, when there are a plurality of receivers, having successfully received the same REQ_SIG transmitted from a transmitter #X, and when a distance between the transmitter #X and the receiver is (partially) different, from a viewpoint of the transmitter #X, REP_SIGs having a large received power difference may be prevented from being frequency division multiplexed (FDM) at the same time point. That is, when the received power difference between the FDMed REP_SIGs is large, REP_SIG of (relatively) small received power is failed in receiving or receives a lot of interference by "INBAND EMISSION" caused by REP_SIG of (relatively) large received power, and when the above rule is applied, by preventing such a problem, reception reliability of REP_SIG can be improved.

(Linked) REP_SIG resource (/pool) information for each REQ_SIG received power level (range) may be set in advance (from the network or the eNB).

As another example, when the UE transmits a distance measurement signal to a predefined specific (type) wireless communication device (e.g., RSU, eNB) (and/or when the UE requests to measure a distance (to itself), such as UPLINK-TIME DIFFERENCE OF ARRIVAL (U-TDOA), the UE may use (/select) resources (/pools) of different time points according to an RSRP measurement value of a reference signal (for a predefined purpose) transmitted by the specific (type) wireless communication device.

[Proposed Method #2] The receiver may use (/select) REP_SIG resources (/pools) of different time points according to a location thereof for transmission of REP_SIG for the successfully received REQ_SIG.

Figure 19:
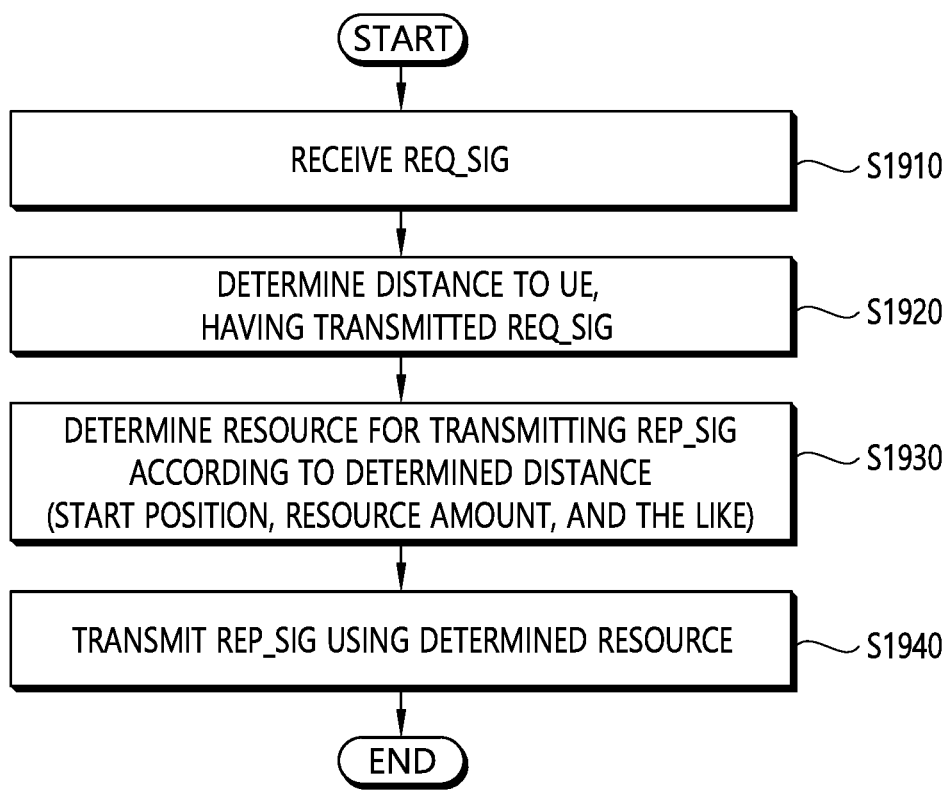
FIG. 19 illustrates a method of transmitting a ranging response signal according to a proposed method #2.

FIG. 19 illustrates a method of transmitting a ranging response signal according to a proposed method #2.

Referring to FIG. 19, the UE receives a ranging request signal (REQ_SIG) (S1910). The UE determines a distance to the UE, having transmitted the REQ_SIG (S1920), and determines a resource for transmitting a ranging response signal (REP_SIG) according to the determined distance (S1930). For example, the UE may determine a start position (time point) of a resource for transmitting a REP_SIG, a resource amount, and the like. The UE transmits the REP_SIG using the determined resource (S1940).

Figure 20:
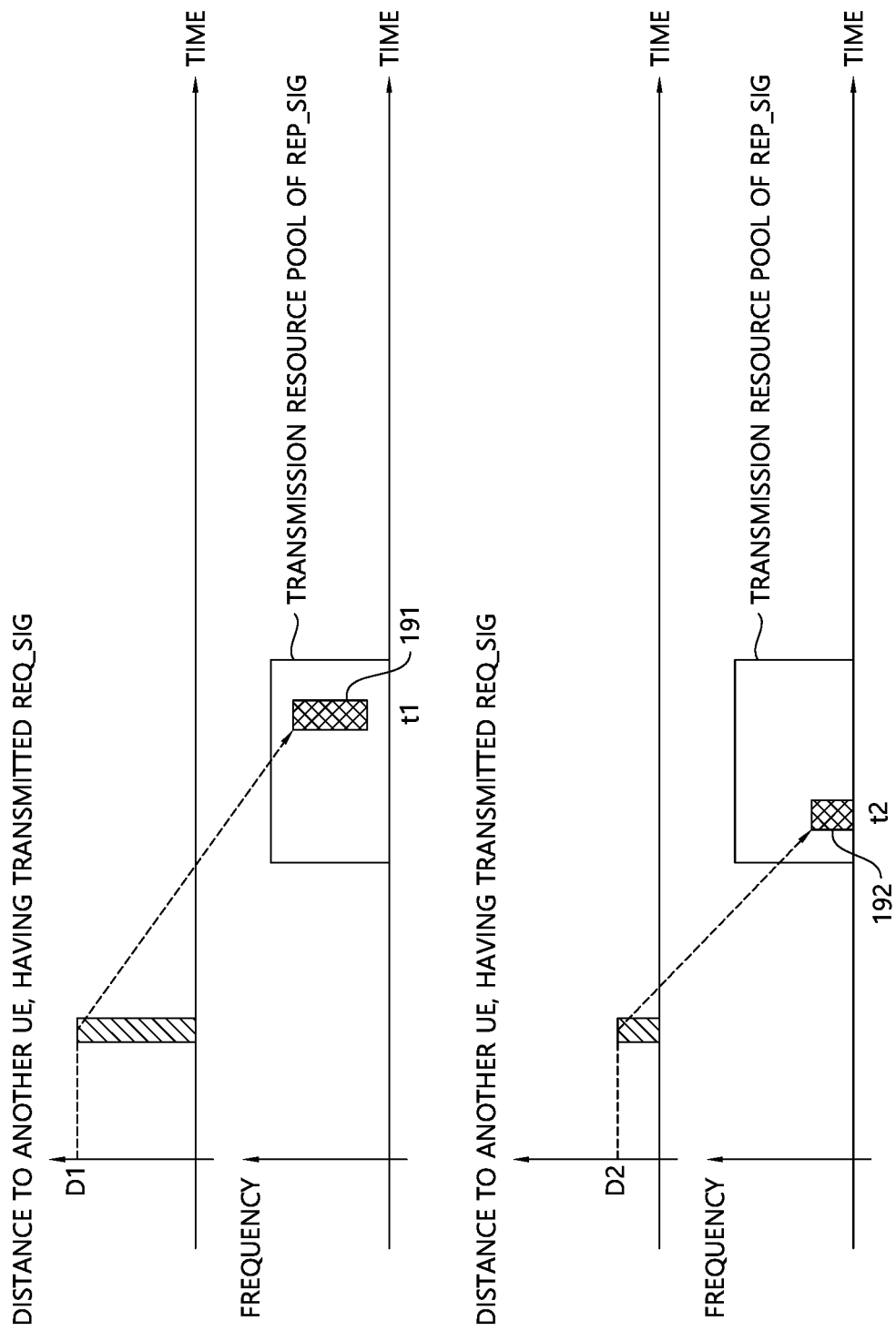
FIG. 20 is a diagram conceptually illustrating an example of a method of transmitting a ranging response signal according to a proposed method #2.

FIG. 20 is a diagram conceptually illustrating an example of a method of transmitting a ranging response signal according to a proposed method #2.

Referring to FIG. 20, after receiving the REQ_SIG, the UE determines a distance to another UE, having transmitted the REQ_SIG. In this case, when the distance is, for example, D1, the UE may transmit a REP_SIG using a first resource 191 located at time t1 in the transmission resource pool of the ranging response signal REP_SIG.

However, the UE received the REQ_SIG, and when a distance to another UE, having transmitted the REQ_SIG is D2, the UE may transmit a REP_SIG using a second resource 192 located at a time t2 within a transmission resource pool of the ranging response signal REP_SIG.

That is, the UE may determine a start position (time point) of a resource for transmitting the REP_SIG, a resource amount, etc., according to a distance to anther UE, having transmitted the REQ_SIG, and transmit a REP_SIG using the resource.

Figure 21:
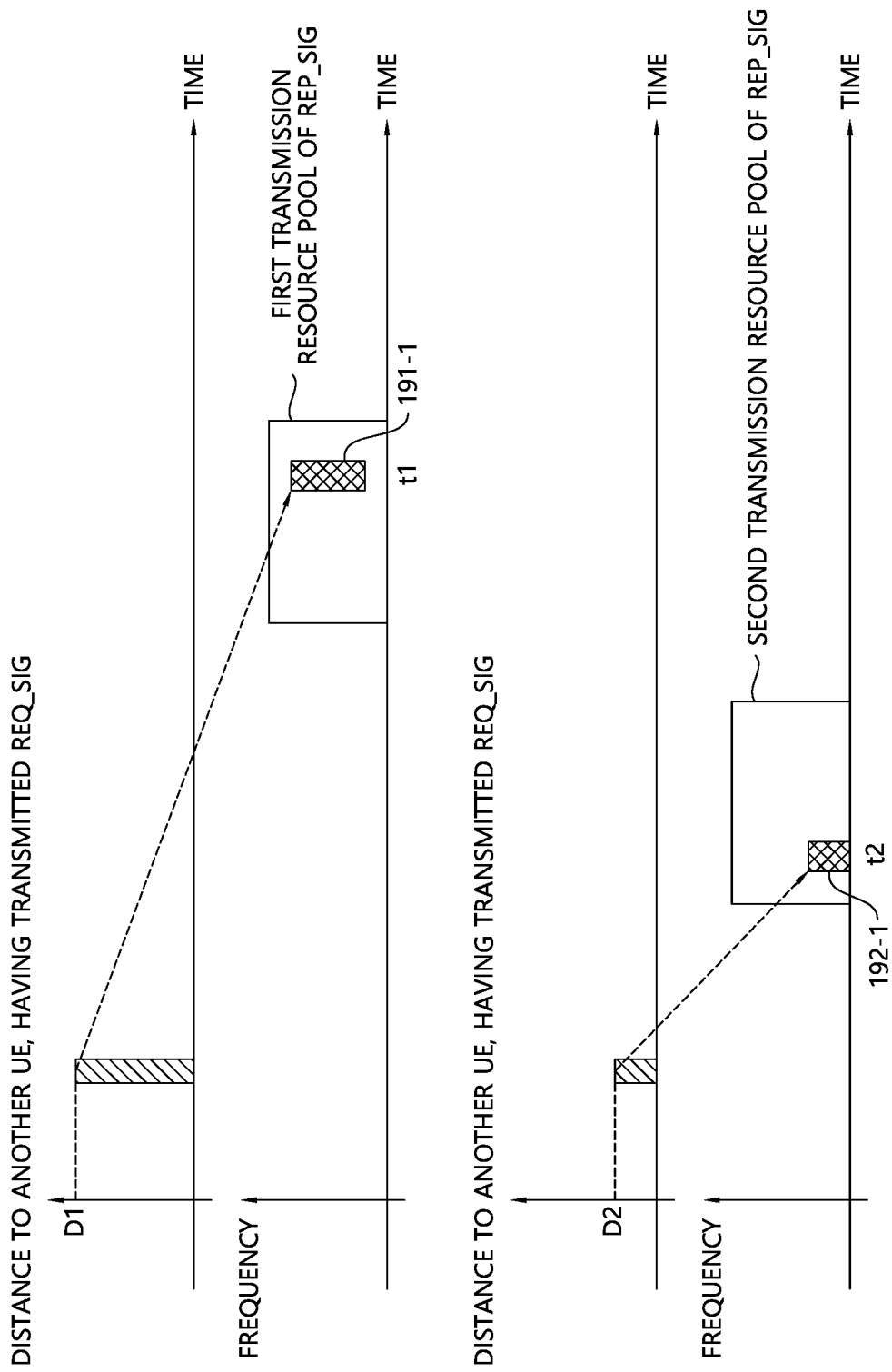
FIG. 21 is a diagram conceptually illustrating another example of a method of transmitting a ranging response signal according to a proposed method #2.

FIG. 21 is a diagram conceptually illustrating another example of a method of transmitting a ranging response signal according to a proposed method #2.

Referring to FIG. 21, after receiving the ranging request signal REQ_SIG, the UE determines a distance to another UE, having transmitted the ranging request signal. In this case, when the distance is, for example, D1, the UE may transmit a ranging response signal REP_SIG using a first resource 191-1 located at a time t1 in a first transmission resource pool of the ranging response signal REP_SIG.

However, the UE received the REQ_SIG, and when a distance to another UE, having transmitted the REQ_SIG is D2, the UE may transmit a REP_SIG using a second resource 192-1 located at a time t2 within a second transmission resource pool of the REP_SIG. Here, the first transmission resource pool and the second transmission resource pool may be in a time division multiplexing (TDM) relationship. Here, the first transmission resource pool may lag in time compared to the second transmission resource pool.

However, in FIG. 21, when a distance to another UE, having transmitted a ranging request signal is relatively distant (D1 at D1>D2), an example of selecting a transmission resource of the ranging response signal in the first transmission resource pool lagged behind in time has been described, but it is not necessarily limited thereto. That is, when a distance to another UE, having transmitted the ranging request signal is relatively distant (D1), the UE may select a transmission resource of the ranging response signal in the second transmission resource pool ahead of time. Similarly, when a distance to another UE, having transmitted a ranging request signal is relatively short (D2), the UE may select a transmission resource of the ranging response signal in the first transmission resource pool lagged behind in time.

In the example of FIG. 21, one transmission resource pool of different transmission resource pools that are TDM may be selected according to a distance to another UE, having transmitted a ranging request signal, and the UE may select a transmission resource for transmitting a ranging response signal within the transmission resource pool. However, in the example of FIG. 20, according to a distance to another UE, having transmitted a ranging request signal, there is a difference in which one of transmission resources that are TDM in the same transmission resource pool is selected. Further, the method of FIG. 18 and the method of FIG. 21 may be combined. That is, selection of a transmission resource pool/resource for transmitting the ranging response signal may be determined based on received power of the ranging request signal and a distance to another UE, having transmitted the ranging request signal.

When the above rule is applied, an inband emission problem described in the [Proposed Method #1] may be mitigated, and from a viewpoint of the transmitter (e.g., REQ_SIG #X transmission), REP_SIGs (e.g., when the reception timing difference is greater than a CP length) of different reception (or transmission) timings transmitted by receivers separated by different distances (e.g., receiver successfully received REQ_SIG #X) may solve a REP_SIG reception performance decrease (and/or decoding complexity) problem caused by overlapping within the same subframe. Such effect can be obtained even when the [Proposed Method #1] is applied.

[Proposal method #3] When REP_SIG for REQ_SIG transmitted by the transmitter is not received (successfully) within a preset time (or latency time), the transmitter may ramp (increase)(OPTION #A) REQ_SIG transmission power in a preset offset unit. Here, as an example, when the corresponding OPTION #A rule and the above-described [proposed method #1] are applied at the same time, the transmitter may transmit (additionally) (transmission power) ramping value information on the REQ_SIG (e.g., a distance measurement signal payload or a channel for a predefined use).

Figure 22:
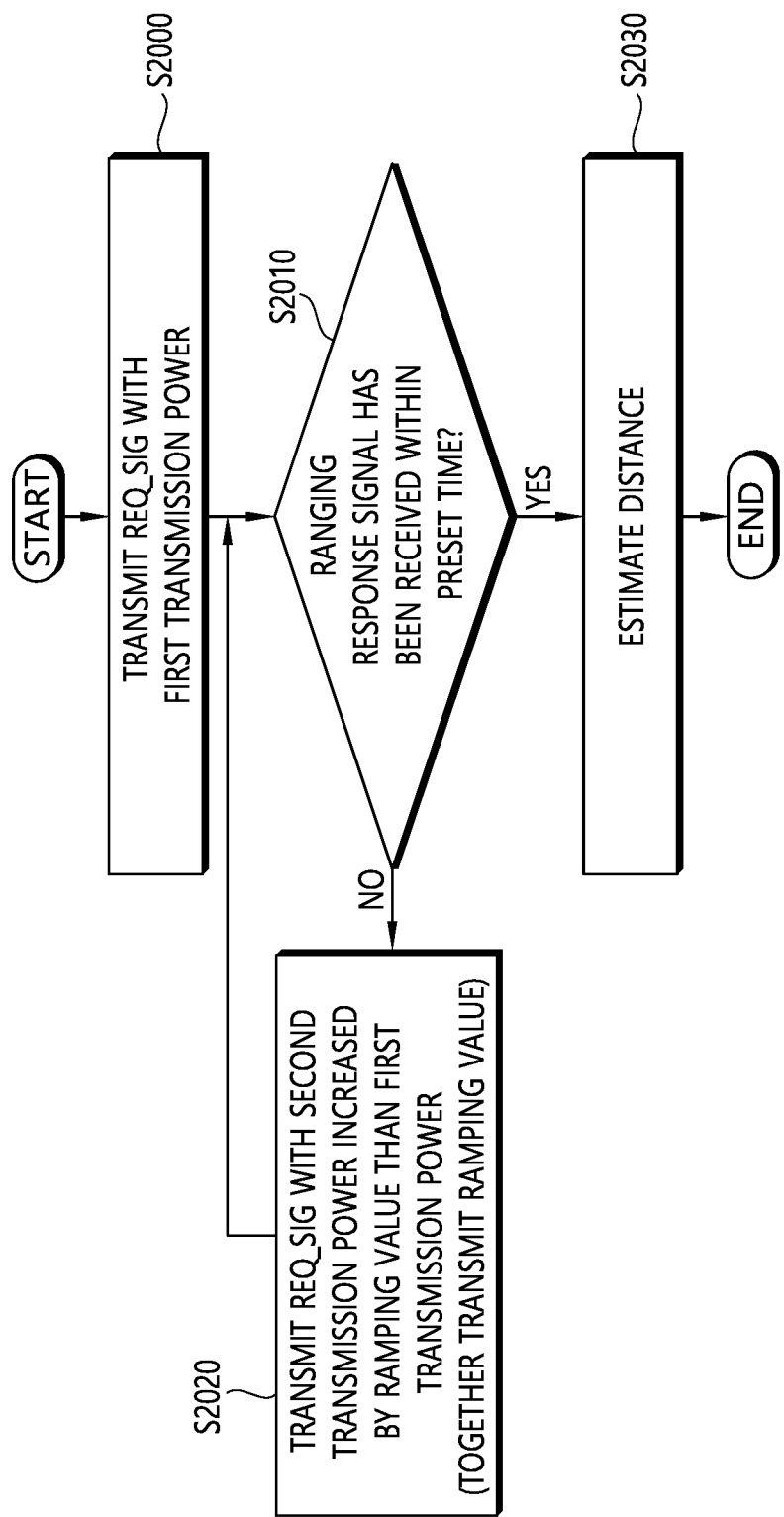
FIG. 22 is a diagram illustrating an operation method of an UE according to a proposed method #3 from the viewpoint of a transmitter.

FIG. 22 is a diagram illustrating an operation method of an UE according to a proposed method #3 from the viewpoint of a transmitter.

Referring to FIG. 22, the transmitter transmits a ranging request signal REQ_SIG with first transmission power (S2000). The transmitter determines whether a ranging response signal has been received within a preset time (or delay time) (S2010), and if a ranging response signal has been received within a preset time (or delay time), the transmitter estimates a distance based on the ranging response signal (S2030). If the ranging response signal has been not received within the preset time (or delay time), the transmitter transmits a ranging request signal REQ_SIG with second transmission power increased by a ramping value than the first transmission power, and in this case, the transmitter also transmits the ramping value (S2020).

In this case, the receiver may use the remaining (power) value that subtracts the corresponding (signaled) ramping value from a "received power value of REQ_SIG" as a REP_SIG transmission related resource (/pool) selection criterion.

Figure 23:
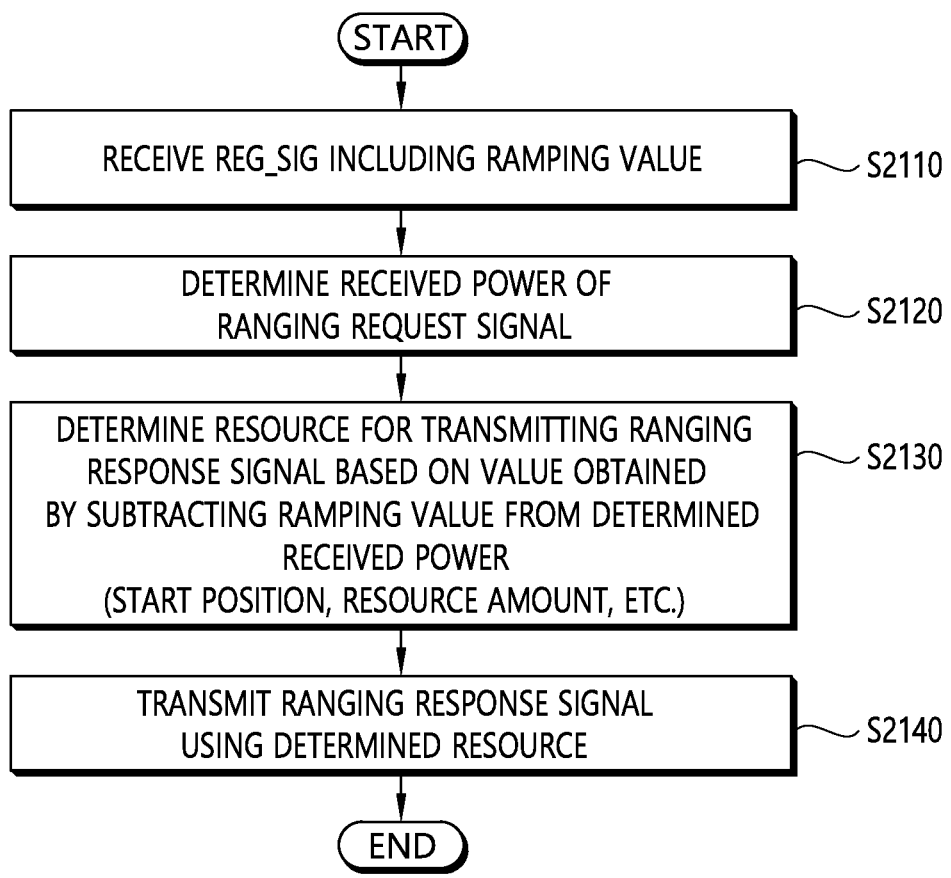
FIG. 23 is a diagram illustrating a method of operating a UE according to a proposed method #3 from the viewpoint of a receiver.

FIG. 23 is a diagram illustrating a method of operating a UE according to a proposed method #3 from the viewpoint of a receiver.

Referring to FIG. 23, the UE receives a ranging request signal REG_SIG including a ramping value from another UE (52110). The UE determines received power of the ranging request signal (52120), and determines a resource for transmitting a ranging response signal based on a value obtained by subtracting the ramping value from the determined received power (start position, resource amount, etc.) (2130). Thereafter, the UE transmits the ranging response signal using the determined resource (S2140).

For example, it is assumed that a UE A transmitted a first ranging request signal with a first transmission power value, but did not receive a ranging response signal from a UE B within a predetermined time. In this case, the UE A may again transmit a second ranging request signal with a second transmission power value in which the first transmission power value is increased by the ramping value.

In this case, the UE A may transmit together information notifying the ramping value when transmitting the second ranging request signal. The UE B determines received power when the second ranging request signal is received. The UE B determines a resource for transmitting a ranging response signal based on a value obtained by subtracting the ramping value from the received power. The reason that the UE B subtracts the ramping value from the received power is that the UE B determines a distance to the UE A or a channel state considering that the UE A increased transmission power and then transmitted a ranging request signal or that (ranging response signal related) transmission resource is determined considering in-band emission in which a ranging response signal transmitted by the UE B is actually caused at the UE A side.

As another example, even if the OPTION #A rule and the above-described [proposed method #1] are applied at the same time, the receiver may use (only) an REQ_SIG received power value as an REP_SIG transmission related resource (/pool) selection criterion.

[Proposed Method #4] As long as at least one of the following examples #4-1 to 4-5 is satisfied, the receiver may FDM REP_SIG transmission(s) for (a plurality of) REQ_SIGs successfully received at the same time as possible.

Figure 24:
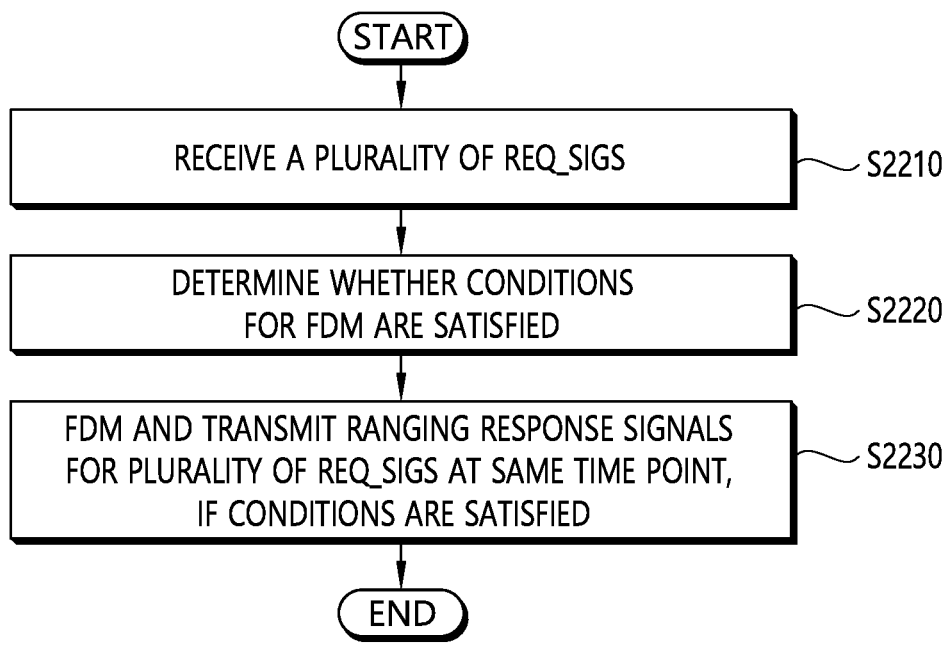
FIG. 24 shows an operation method of the UE according to a proposed method #4.

FIG. 24 shows an operation method of the UE according to a proposed method #4.

Referring to FIG. 24, the UE receives a plurality of ranging request signals REQ_SIG (52210), determines whether conditions for FDM are satisfied (S222), and if the conditions are satisfied, the UE FDM and transmits ranging response signals for the plurality of ranging requests at the same time point (S2230).

The conditions for the FDM may be at least one of the following examples.

Example #4-1

When it does not reach a power-limited case (e.g., when the sum of transmitting power of a plurality of REP_SIGs being FDM does not exceed a maximum power value of the receiver (e.g., 23 dBm))

Example #4-2

When the maximum allowance number of preset REP_SIGs of being FDMed does not exceed.

Example #4-3

When the REP_SIG transmission timing difference (or linked REQ_SIG reception timing difference) is equal to or less than a preset threshold (the threshold may be, for example, a CP length).

Example #4-4

Upon selecting a (REP_SIG) transmission resource based on sensing, when the number of resources determined to "idle" (at the same time point) (e.g., the number of resources in which interference (or collision probability) is lower than a preset threshold) does not exceed.

Example #4-5

When the linked REQ_SIG received power difference is equal to or less than a preset threshold.

When the proposed method #4 is applied, it is possible to mitigate a half-duplex problem in which a REQ_SIG reception opportunity is relatively reduced due to a large number of REP_SIG transmission(s) distributed in a time domain from a viewpoint of the receiver. Further, by reducing LATENCY between the successfully received REQ_SIG and REP_SIG transmission linked thereto, it is possible to obtain improvement in reliability (or performance) of distance measurement.

As another example, selection of a reference REP_SIG for deriving selection of REP_SIG satisfying the above-described FDM allowance condition (and/or REP_SIG transmission timing difference (or (linked) REQ_SIG received power difference)) among REP_SIG transmission(s) for (a plurality of) REQ_SIGs, having successfully received may be performed according to the following (some) priority rules (e.g., at least one of examples #4-5 to #4-9).

Example #4-5

REP_SIG related to REQ_SIG of the transmitter located at REQ_SIG (or a relatively close (or distant) distance) related to REP_SIG of relatively higher (or lower) received power (or than a preset threshold).

Example #4-6

REP_SIG for REQ_SIG related to application program (or service) of a relatively high priority (or REP_SIG for REQ_SIG related to an application program (or service) of interest).

The above rule may be limitedly applied when application program identity (ID) information or service ID information is included in REQ_SIG.

Example #4-7

REP_SIG related to REQ_SIG requesting a response (/reply) thereof. For example, distance measurement (or response) target (group) ID information may be included on REQ_SIG.

Example #4-8

REP_SIG related to REQ_SIG successfully received in a relatively long (or short) period (or REP_SIG related to REQ_SIG of a transmitter in which a time that is not responded (/replied) by itself is relatively long (or short)).

The above rule may be limitedly applied when (group) ID information of the transmitter is included in REQ_SIG.

Example #4-9

REP_SIG related to a randomly selected REQ_SIG.

Because examples of the above-described proposed method may be included as one of implementation methods of the present disclosure, it is obvious that the examples may be regarded as a kind of proposed methods.

Further, the above-described proposed methods may be implemented independently, but may be implemented in a combination (or merge) form of some proposed methods. The present disclosure has described the proposed method based on a 3GPP LTE system for convenience of description, but the range of the system to which the proposed method is applied may be extended to other systems in addition to the 3GPP LTE/LTE-A system. As an example, (some) proposed methods of the present disclosure may be applied in an extended manner for D2D communication. D2D communication may mean that a UE communicates directly with another UE using a wireless channel. A UE means a user's UE, but when a network equipment such as an eNB transmits/receives a signal according to a communication method between UEs, the network equipment may also be regarded as a kind of UE. The (some) proposed methods of the present disclosure are not limited to direct communication between UEs, and may be used in uplink or downlink. In this case, the proposed method may be used by an eNB or a relay node.

Information on whether to apply the proposed methods of the present disclosure or information on rules of the proposed methods may be defined to enable the eNB to notify the UE or to enable the transmitting UE to notify the receiving UE through a predefined signal (e.g., physical layer signal or higher layer signal). (some) proposed methods of the present disclosure may be limitedly applied only to a MODE #3 operation (e.g., the mode #3 operation may be a mode in which the eNB signals (/controls) V2X message transmission (/reception)) related scheduling information and/or a MODE #4 operation (e.g., the mode #4 operation may be a mode in which the UE (independently) determines (/controls) V2X message transmission (/reception) related scheduling information).

Hereinafter, a wireless communication device according to an embodiment of the present disclosure will be described.

Figure 25:
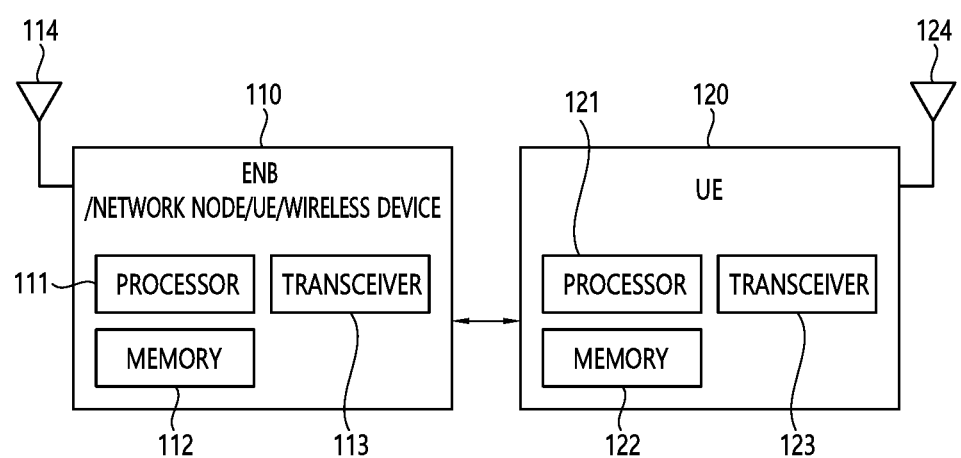
FIG. 25 is a block diagram illustrating an example of a wireless communication device according to an embodiment of the present disclosure.

FIG. 25 is a block diagram illustrating an example of a wireless communication device according to an embodiment of the present disclosure.

Referring to the example of FIG. 25, a wireless communication system may include an eNB 110 and a UE 120. The UE 120 may be located within an area of the eNB 110. In some scenarios, the wireless communication system may include a plurality of UEs. In the example of FIG. 25, the eNB 110 and the UE 120 are illustrated, but the present disclosure is not limited thereto. For example, the eNB 110 may be replaced with another network node, UE, wireless device, or the like.

The eNB and the UE may each be represented by a wireless communication device or a wireless device. The eNB in FIG. 25 may be replaced with a network node, wireless device, or UE.

The eNB 110 includes at least one processor such as a processor 111, at least one memory such as a memory 112, and at least one transceiver such as a transceiver 113. The processor 111 performs the above-described functions, procedures, and/or methods. The processor 111 may perform one or more protocols. For example, the processor 111 may perform one or more layers (e.g., functional layer) of a radio interface protocol. The memory 112 is connected to the processor 111 and stores various types of information and/or commands. The transceiver 113 may be connected to the processor 111 and be controlled to transmit and receive wireless signals.

The UE 120 includes at least one processor such as a processor 121, at least one memory device such as a memory 122, and at least one transceiver such as a transceiver 123.

The processor 121 performs the above-described functions, procedures, and/or methods. The processor 121 may implement one or more protocols. For example, the processor 121 may implement one or more layers (e.g., functional layer) of a radio interface protocol. The memory 122 is connected to the processor 121 and stores various types of information and/or commands. The transceiver 123 may be connected to the processor 121 and be controlled to transmit and receive wireless signals.

The memory 112 and/or the memory 122 may be connected to the inside or the outside of the processor 111 and/or the processor 121, respectively and be connected to other processors through various technologies such as wired or wireless connection.

The eNB 110 and/or the UE 120 may have one or more antennas. For example, an antenna 114 and/or an antenna 124 may be configured to transmit and receive wireless signals.

Figure 26:
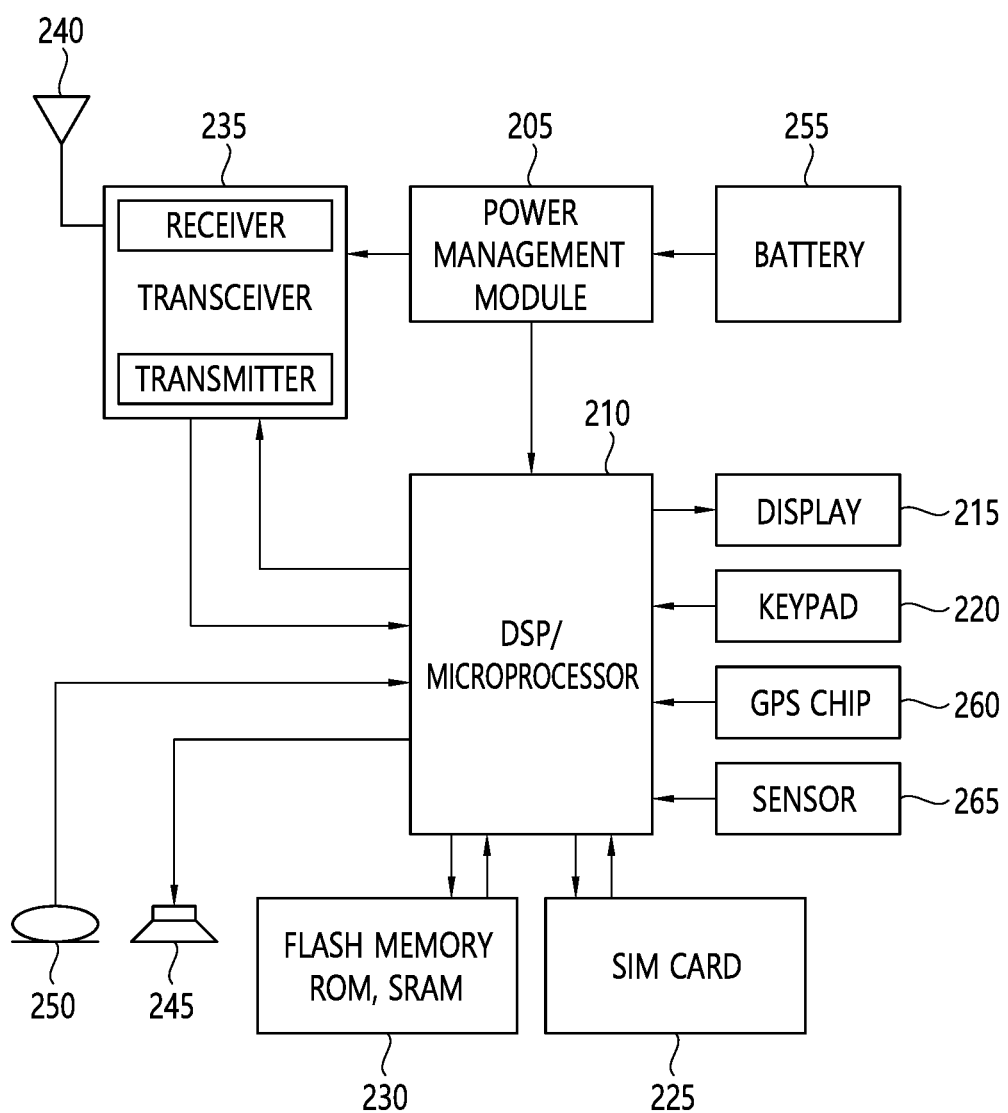
FIG. 26 shows an example of a wireless communication device in which an embodiment of the present disclosure is implemented.

FIG. 26 shows an example of a wireless communication device in which an embodiment of the present disclosure is implemented.

In particular, FIG. 26 is a diagram illustrating an example of the UE 100 of FIG. 25 in more detail. The UE may be any appropriate mobile computer device configured to perform one or more implementations of the present disclosure, such as a vehicle communication system or device, a wearable device, a portable computer, a smart phone, and the like.

Referring to the example of FIG. 26, the UE may include at least one processor (e.g., DSP or microprocessor) such as a processor 210, a transceiver 235, a power management module 205, an antenna 240, a battery 255, a display 215, a keypad 220, a global positioning system (GPS) chip 260, a sensor 265, a memory 230, a subscriber identification module (SIM) card 225 (which may be optional), a speaker 245, and a microphone 250. The UE may include one or more antennas.

The processor 210 may be configured to perform the above-described functions, procedures, and/or methods. According to an implementation example, the processor 210 may perform one or more protocols, such as layers of a radio interface protocol (e.g., functional layers).

The memory 230 is connected to the processor 210 and stores information related to the operation of the processor. The memory may be located inside or outside the processor, and be connected to other processors through various technologies such as a wired or wireless connection.

The user may input various types of information (e.g., command information such as a phone number) by pressing buttons of the keypad 220 or using various techniques such as voice activation using the microphone 250. The processor receives and processes the user's information and performs appropriate functions such as dialing a phone number. For example, data (e.g., operational data) may be retrieved from the SIM card 225 or the memory 230 in order to perform functions. As another example, the processor may receive and process GPS information from the GPS chip 260 in order to perform functions related to a location of the device, such as a vehicle navigation device and a map service. As another example, the processor may display various types of information and data on the display 215 for user reference or convenience.

The transceiver 235 is connected to the processor, and transmits and receives a radio signal such as a radio frequency (RF) signal. The processor may control the transceiver to initiate communication and to transmit wireless signals including various types of information or data, such as voice communication data. The transceiver includes one receiver and one transmitter in order to transmit or receive wireless signals. The antenna 240 facilitates transmission and reception of wireless signals. According to an implementation example, in receiving wireless signals, the transceiver may forward and convert the signals with a baseband frequency in order to process the signals using the processor. The processed signals may be processed according to various techniques, such as being converted into information that can be heard or read to be output through the speaker 245.

According to the implementation example, the sensor 265 may be connected to the processor. The sensor may include one or more sensing devices configured to discover various types of information including a speed, acceleration, light, vibration, proximity, location, images, and the like, but not limited thereto. The processor may receive and process sensor information obtained from the sensor and perform various types of functions such as collision prevention and automatic driving.

In the example of FIG. 26, various components (e.g., camera, USB port, etc.) may be further included in the UE. For example, the camera may be connected to the processor and be used for various services such as automatic driving, vehicle safety services, and the like.

In this way, FIG. 26 is an example of a UE, and implementation is not limited thereto. For example, some components (e.g., the keypad 220, the GPS chip 260, the sensor 265, the speaker 245, and/or the microphone 250) may not be implemented in some scenarios.

Figure 27:
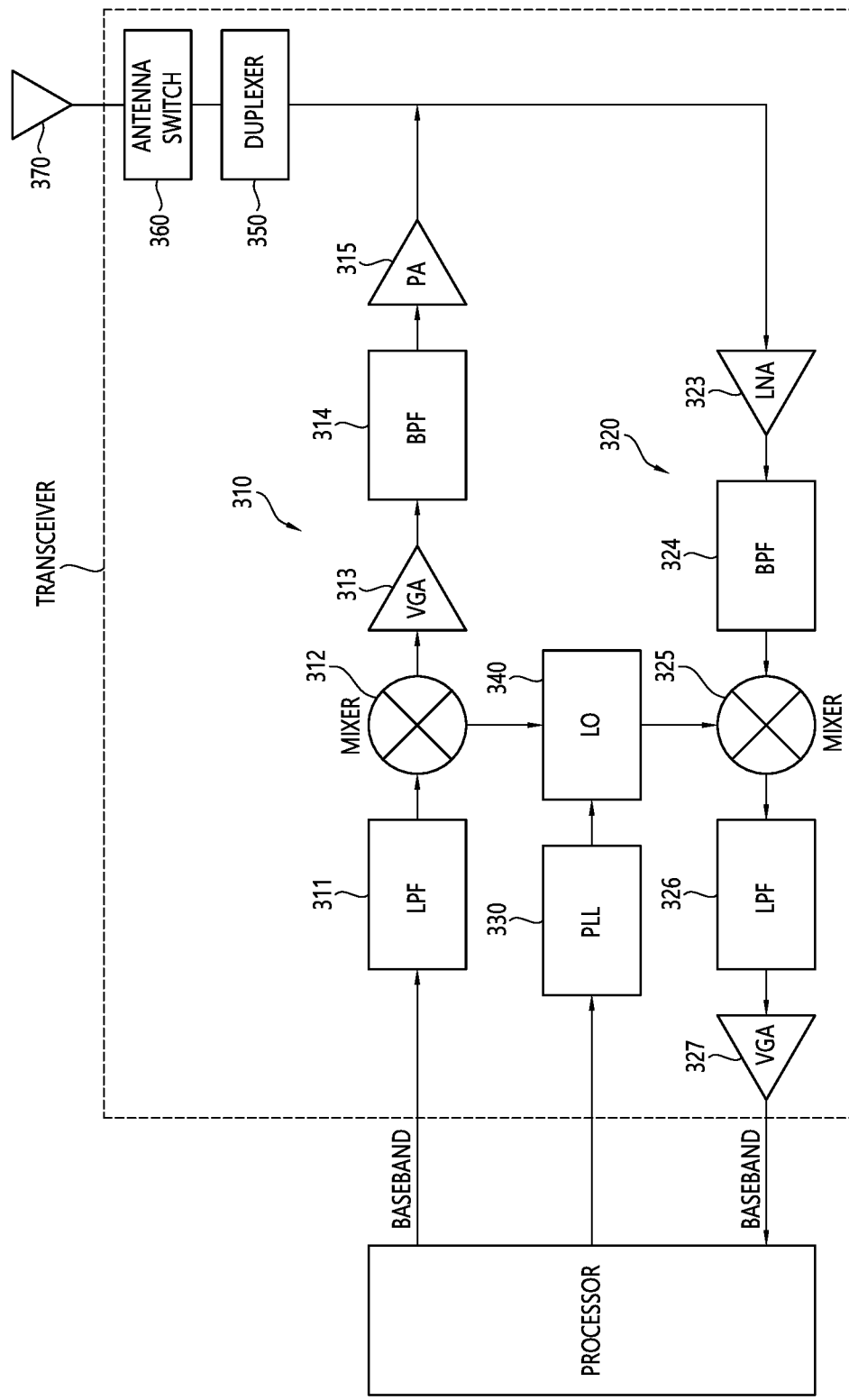
FIG. 27 shows an example of a transceiver of a wireless communication device according to an embodiment of the present disclosure.

FIG. 27 shows an example of a transceiver of a wireless communication device according to an embodiment of the present disclosure.

In particular, FIG. 27 shows an example of a transceiver that may be implemented in a frequency division duplex (FDD) system.

In a transmission path, at least one processor, such as the processors described in FIGS. 25 and 26, may process data to be transmitted and transmit a signal such as an analog output signal to a transmitter 310.

In the above example, the analog output signal at the transmitter 310 is filtered by a low pass filter (LPF) 311, for example, in order to remove noise due to previous digital-to-analog conversion (ADC), is up-converted by an up-converter (e.g., mixer) 312 from a baseband to an RF, and is amplified by an amplifier such as a variable gain amplifier (VGA) 313. The amplified signal is filtered by a filter 314, is amplified by a power amplifier (PA) 315, is routed through a duplexer(s) 350/antenna switch(s) 360, and is transmitted through an antenna 370.

In the reception path, the antenna 370 receives signals in a wireless environment, and the received signals are routed at the antenna switch(s) 360/duplexer(s) 350 and are sent to a receiver 320.

In the above example, a signal received at the receiver 320 is amplified by an amplifier such as a low noise amplifier (LNA) 323, is filtered by a band pass filter 324, and is down-converted by a down-converter (e.g., mixer) 325 from the RF to the baseband.

The down-converted signal is filtered by a low pass filter (LPF) 326 and is amplified by an amplifier such as a VGA 327 in order to obtain an analog input signal, and the analog input signal is provided to one or more processors, such as the processor in FIGS. 25 and 26.

Furthermore, a local oscillator (LO) 340 generates transmission and reception of an LO signal and transmits the LO signal to each of the up-converter 312 and the down-converter 325.

In some implementations, a phase locked loop (PLL) 330 may receive control information from the processor and transmit control signals to the LO 340 in order to generate transmission and reception of LO signals at an appropriate frequency.

Implementations are not limited to a particular disposition illustrated in FIG. 27, and various components and circuits may be disposed differently from the example illustrated in FIG. 26.

Figure 28:
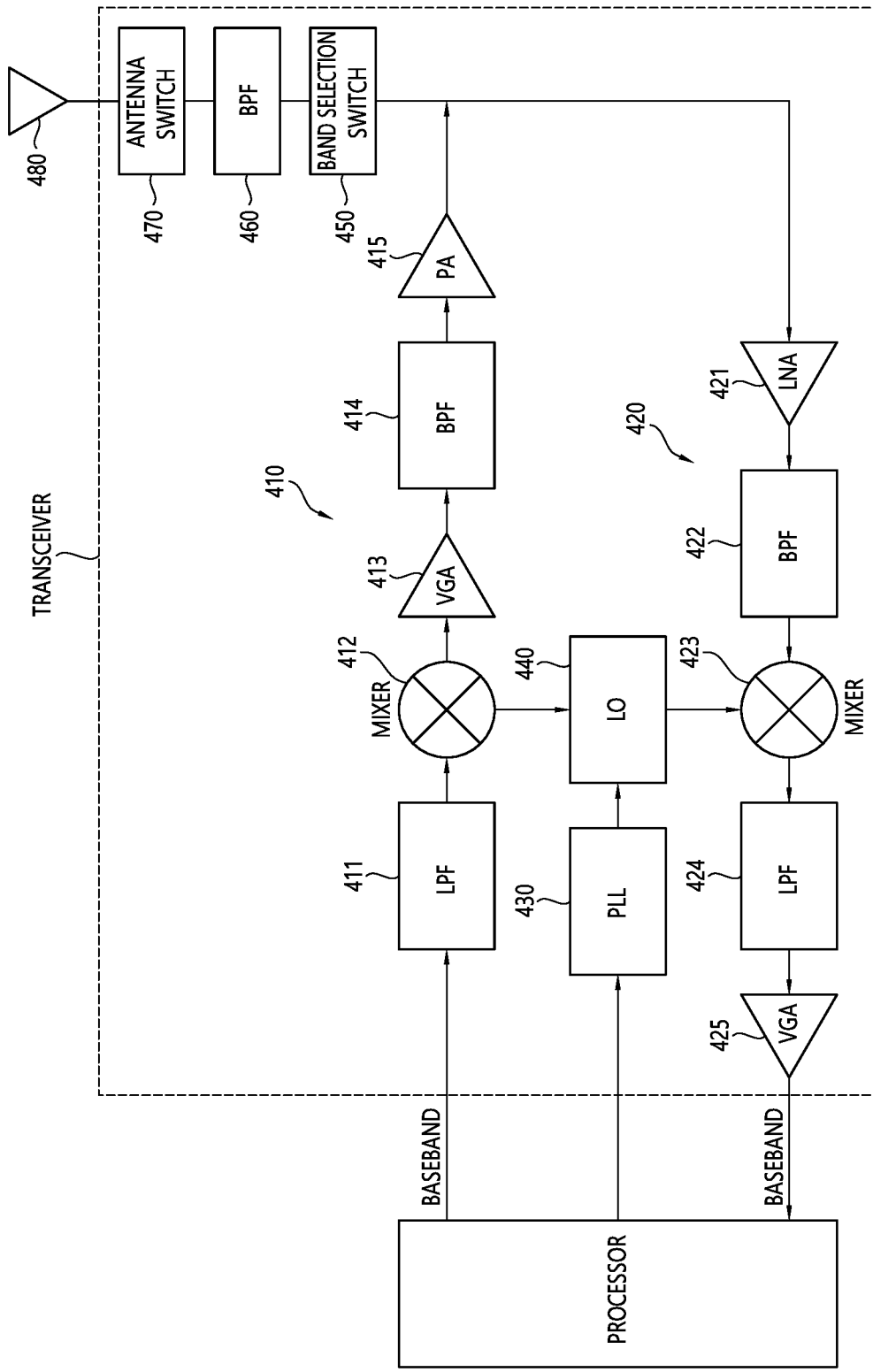
FIG. 28 shows another example of a transceiver of a wireless communication device according to an embodiment of the present disclosure.

FIG. 28 shows another example of a transceiver of a wireless communication device according to an embodiment of the present disclosure.

In particular, FIG. 28 shows an example of a transceiver that can be implemented in a time division duplex (TDD) system.

According to an implementation example, a transmitter 410 and a receiver 420 of the transceiver of the TDD system may have one or more similar characteristics to that of a transmitter and a receiver of a transceiver of an FDD system.

Hereinafter, a structure of the transceiver of the TDD system will be described.

In a transmission path, a signal amplified by a power amplifier (PA) 415 of the transmitter is routed through a band selection switch 450, a band pass filter (BPF) 460, and an antenna switch(s) 470 and is transmitted to an antenna 480.

In a reception path, the antenna 480 receives signals from a wireless environment, and the received signals are routed through the antenna switch(s) 470, the BPF 460, and the band selection switch 450 and are provided to the receiver 420.

Figure 29:
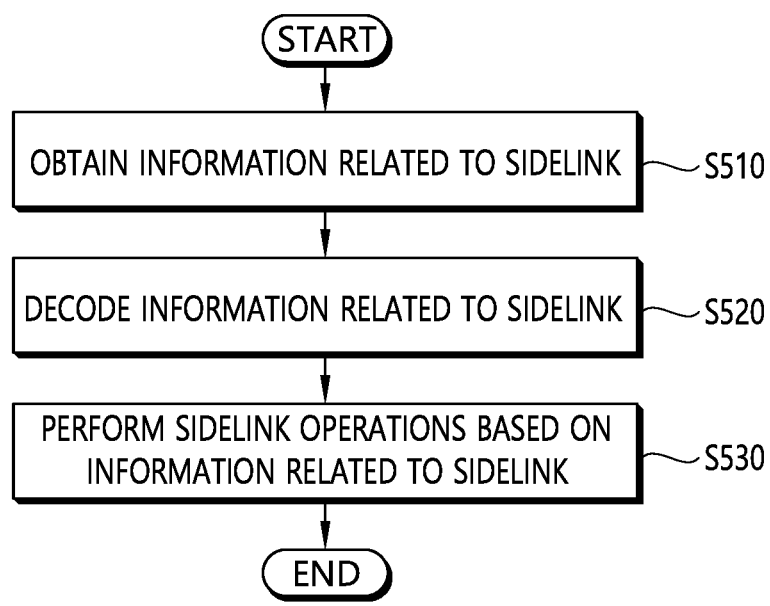
FIG. 29 shows an example of an operation of a wireless device related to sidelink communication.

FIG. 29 shows an example of an operation of a wireless device related to sidelink communication. An operation of the wireless device related to the sidelink described in FIG. 29 is merely an example, and sidelink operations using various technologies may be performed in the wireless device. The sidelink is a UE-to-UE interface for sidelink communication and/or sidelink discovery. The sidelink may correspond to a PC5 interface. In a broad sense, a sidelink operation may be transmission and reception of information between UEs. The sidelink may carry various types of information.

In the above example, the wireless device obtains information related to the sidelink (S510). The information related to the sidelink may be one or more resource configurations. Sidelink related information may be obtained from other wireless devices or network nodes.

After obtaining information, the wireless device decodes the information related to the sidelink (S520).

After decoding the information related to the sidelink, the wireless device performs one or more sidelink operations based on the information related to the sidelink (S530). Here, the sidelink operation(s) performed by the wireless device may be one or more operations described in the present disclosure.

Figure 30:
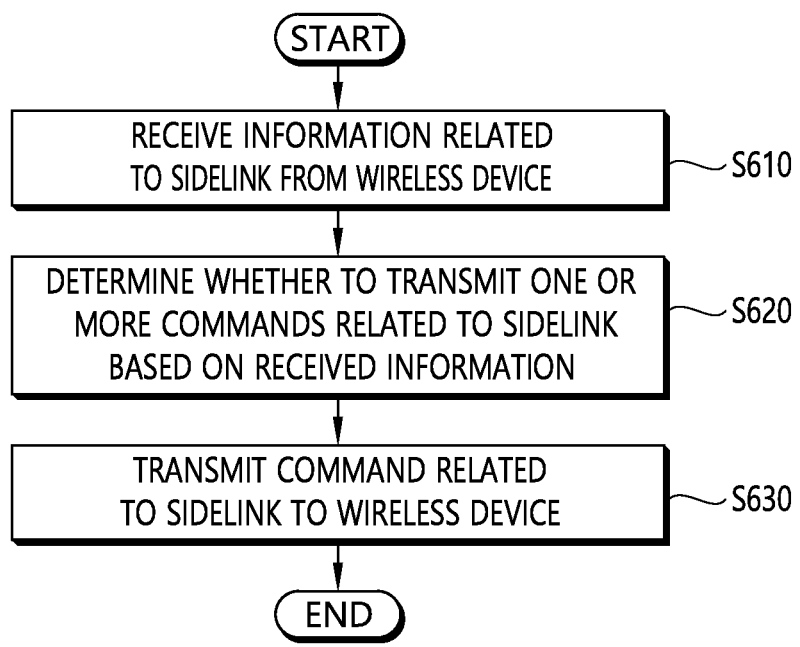
FIG. 30 shows an example of operation of a network node related to a sidelink.

FIG. 30 shows an example of operation of a network node related to a sidelink. The network node operation related to the sidelink described in FIG. 30 is merely an example, and sidelink operations using various technologies may be performed at the network node.

The network node receives information related to the sidelink from the wireless device (S610). For example, the information related to the sidelink may be "SidelinkUEInformation" used for notifying the network node of the sidelink information.

After receiving the information, the network node determines whether to transmit one or more commands related to the sidelink based on the received information (S620).

According to determination of the network node to transmit the command, the network node transmits a command(s) related to the sidelink to the wireless device (S630). According to an implementation example, after receiving a command sent by the network node, the wireless device may perform one or more sidelink operation(s) based on the received command.

Figure 31:
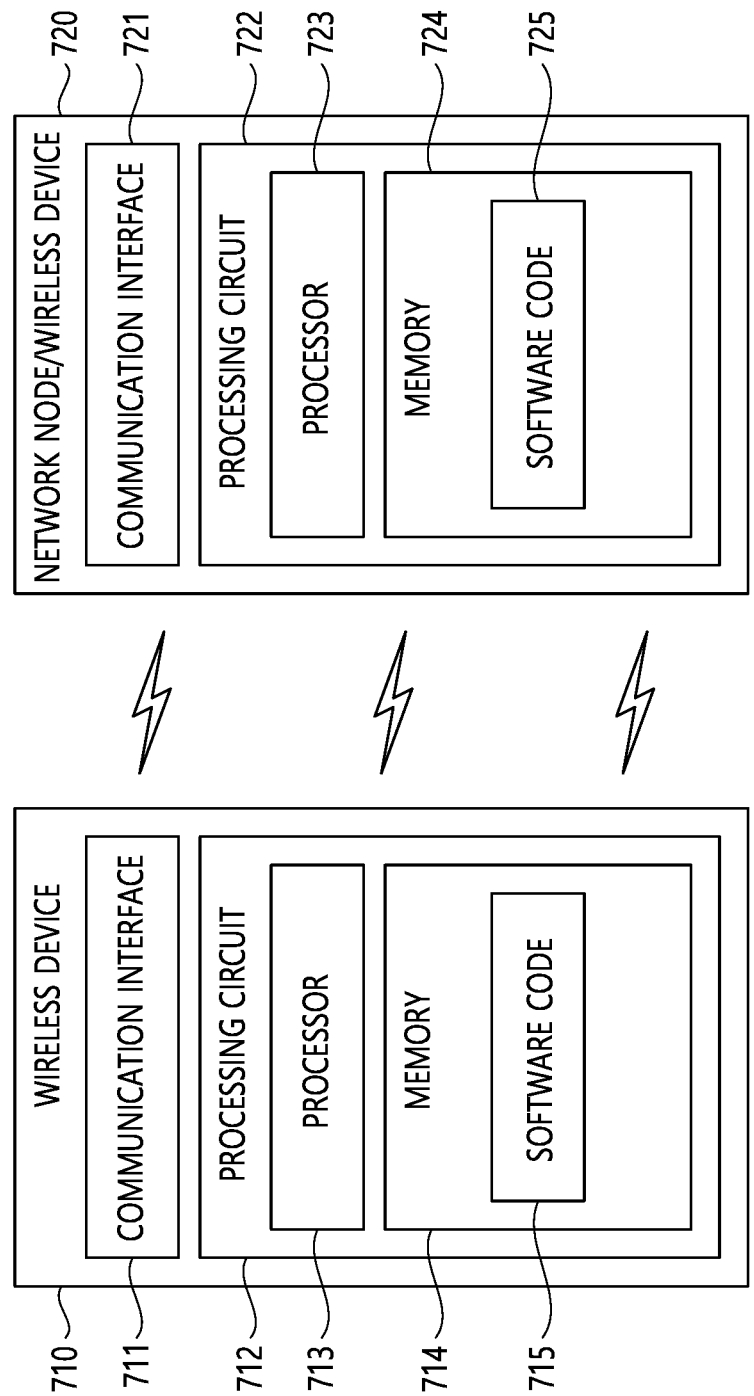
FIG. 31 is a block diagram illustrating an example of communication between a wireless device 710 and a network node 720.

FIG. 31 is a block diagram illustrating an example of communication between a wireless device 710 and a network node 720. The network node 720 may be replaced by the above-described wireless device or UE.

In the above example, in order to communicate with one or more other wireless devices, network nodes and/or other elements within the network, the wireless device 710 includes a communication interface 711. The communication interface 711 may include one or more transmitters, one or more receivers, and/or one or more communication interfaces. The wireless device 710 includes a processing circuit 712. The processing circuit 712 may include one or more processors such as a processor 713 and one or more memories such as a memory 714.

The processing circuit 712 may be configured to control any of the methods and/or processes described in the present disclosure and/or, for example, to enable the wireless device 710 to perform such a method and/or process. The processor 713 corresponds to one or more processors for performing wireless device functions described in the present disclosure. The wireless device 710 includes a memory 714 configured to store data, program software code, and/or other information described in the present disclosure.

In one or more implementations, when one or more processors, such as the processor 713, are executed, the memory 714 is configured to store a software code 715 including commands that enable the processor 713 to perform some or all of the processes discussed in detail in connection with the implementation examples discussed in the present disclosure.

For example, in order to transmit and receive information, as in the processor 713, one or more processors that control one or more transceivers, such as the transceiver 123 of FIG. 25, may perform one or more processes related to transmission and reception of information.

The network node 720 includes a communication interface 721 in order to communicate with one or more other network nodes, wireless devices and/or other elements on the network. Here, the communication interface 721 includes one or more transmitters, one or more receivers, and/or one or more communication interfaces. The network node 720 includes a processing circuit 722. Here, the processing circuit includes a processor 723 and a memory 724.

In various implementations, when executed by one or more processors, such as the processor 723, the memory 724 is configured to store a software code 725 including commands that enable the processor 723 to perform some or all of the processes discussed in detail in connection with the implementation examples discussed in the present disclosure.

For example, in order to transmit and receive information, as in the processor 723, one or more processors that control one or more transceivers, such as the transceiver 113 of FIG. 25, may perform one or more processes related to transmission and reception of information.

What is claimed is:

1. A method of transmitting a ranging response signal performed by a user equipment (UE) in a wireless communication system, the method comprising:
receiving a ranging request signal from another UE; and
transmitting a ranging response signal to the other UE in response to the ranging request signal,
wherein a resource for transmitting the ranging response signal is determined based on a received power level of the ranging request signal,
wherein one transmission resource pool is selected from a plurality of transmission resource pools according to the received power level and a distance to the other UE, and
wherein the resource is determined from amongst one or more resources in the selected transmission resource pool.

2. The method of claim 1, wherein a starting position of the resource for transmitting the ranging response signal is determined according to the received power level.

3. The method of claim 1, further comprising: receiving information notifying the UE of a resource to be used for transmitting the ranging response signal from a network according to the received power level.

4. The method of claim 1, wherein the resource for transmitting the ranging response signal is determined according to the received power level of the ranging request signal and a distance to the other UE.

5. The method of claim 1, wherein, when the received ranging request signal is a second ranging request signal, the second ranging request signal further comprises a ramping value for transmission power.

6. The method of claim 5, wherein the ramping value for the transmission power notifies the UE of an increase in value of a second transmission power, used for transmitting the second ranging request signal, over a first transmission power used for transmitting the first ranging request signal prior to the second ranging request signal by the other UE.

7. The method of claim 6, wherein a resource for transmitting the ranging response signal is determined according to a value obtained by subtracting the ramping value from a received power level of the second ranging request signal.

8. The method of claim 1, wherein a first ranging response signal for the ranging request signal and a second ranging response signal for a second ranging request signal are frequency division multiplexed (FDM) and transmitted at the same time point, when the second ranging request signal is also received.

9. The method of claim 1, wherein one transmission resource pool is selected from a plurality of transmission resource pools according to the received power level, and a resource for transmitting the ranging response signal is determined from amongst one or more resources in the selected transmission resource pool.

10. The method of claim 9, wherein each of the plurality of transmission resource pools are time division multiplexed (TDM).

11. The method of claim 1, wherein each of the plurality of transmission resource pools are time division multiplexed (TDM).

12. A user equipment (UE), comprising:
a transceiver configured to transmit and receive wireless signals; and
a processor configured to control the transceiver,
wherein the processor is further configured to:
receive a ranging request signal from another UE and to transmit a ranging response signal to the other UE in response to the ranging request signal,
wherein a resource for transmitting the ranging response signal is determined based on a received power level of the ranging request signal,
wherein one transmission resource pool is selected from a plurality of transmission resource pools according to the received power level and a distance to the other UE, and
wherein the resource is determined from amongst one or more resources in the selected transmission resource pool.

13. The method of claim 1, wherein each of the UE and the other UE is a vehicle to X (V2X) UE.

* * * * *